(12) United States Patent
Le

(10) Patent No.: US 7,587,810 B2
(45) Date of Patent: Sep. 15, 2009

(54) HIGH MILLING RESISTANCE WRITE POLE FABRICATION METHOD FOR PERPENDICULAR RECORDING

(75) Inventor: Quang Le, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 427 days.

(21) Appl. No.: 11/391,822

(22) Filed: Mar. 28, 2006

(65) Prior Publication Data
US 2006/0174474 A1    Aug. 10, 2006

Related U.S. Application Data

(63) Continuation-in-part of application No. 10/836,867, filed on Apr. 30, 2004.

(51) Int. Cl.
*G11B 5/187* (2006.01)
*B44C 1/22* (2006.01)

(52) U.S. Cl. .............. 29/603.15; 29/603.12; 29/603.16; 216/22; 216/47; 216/66; 204/192.34; 360/122

(58) Field of Classification Search .............. 29/603.12, 29/603.13, 603.14, 603.15, 603.16, 603.08; 204/192.2, 192.34; 360/122, 125.03, 125.54; 216/22, 47, 66
See application file for complete search history.

(56) References Cited

U.S. PATENT DOCUMENTS

| 6,393,692 B1 * | 5/2002 | Ju et al. ................... 29/603.14 |
| 7,127,800 B2 * | 10/2006 | Dinan et al. ............. 29/603.15 |

FOREIGN PATENT DOCUMENTS

JP         08124120 A   *   5/1996

* cited by examiner

*Primary Examiner*—A. Dexter Tugbang
(74) *Attorney, Agent, or Firm*—Zilka-Kotab, PC

(57) ABSTRACT

A mask structure for fabricating a write pole for a perpendicular write head. The mask structure includes a first and second hard mask structures separated by an image transfer layer, such as DURAMIDE®. The first mask structure may be a bi-layer mask structure that functions as a CMP stop as well as a hard mask for ion milling. The first hard mask is chosen to have a desired resistance to removal by ion milling to maintain excellent track width control during an ion milling process used to form the write pole. Therefore, the first hard mask may be comprises of two layers selected from the group consisting of Rh, alumina, and diamond like carbon (DLC). The second hard mask is constructed of a material that functions as a bottom antireflective coating as well as a hard mask.

23 Claims, 24 Drawing Sheets

HIGH MILLING RESISTANCE WRITE POLE FABRICATION METHOD FOR PERPENDICULAR RECORDING

The present application is a Continuation in Part of U.S. patent application Ser. No. 10/836,867 filed Apr. 30, 2004 entitled HIGH MILLING RESISTANCE WRITE POLE FABRICATION METHOD FOR PERPENDICULAR RECORDING, which is incorporated herein by reference.

FIELD OF THE INVENTION

The present invention relates to perpendicular magnetic recording, and more particularly to a method for forming a tapered write pole for a perpendicular write head.

BACKGROUND OF THE INVENTION

At the heart of a computer is a magnetic disk drive that includes a magnetic disk, a slider where a magnetic head assembly including write and read heads is mounted, a suspension arm, and an actuator arm. When the magnetic disk rotates, air adjacent to the disk surface moves with it. This allows the slider to fly on an extremely thin cushion of air, generally referred to as an air bearing. When the slider flies on the air bearing, the actuator arm swings the suspension arm to place the magnetic head assembly over selected circular tracks on the rotating magnetic disk, where signal fields are written and read by the write and read heads, respectively. The write and read heads are connected to processing circuitry that operates according to a computer program to implement write and read functions.

Typically magnetic disk drives have been longitudinal magnetic recording systems, wherein magnetic data is recorded as magnetic transitions formed longitudinally on a disk surface. The surface of the disk is magnetized in a direction along a track of data and then switched to the opposite direction, both directions being parallel with the surface of the disk and parallel with the direction of the data track.

Data density requirements are fast approaching the physical limits, however. For example, increased data capacity requires decreased bit sizes, which in turn requires decreasing the grain size of the magnetic medium. As this grain size shrinks, the magnetic field required to write a bit of data increases proportionally. The ability to produce a magnetic field strong enough to write a bit of data using conventional longitudinal write head technologies is reaching its physical limit.

One means for overcoming this physical limit has been to introduce perpendicular recording. In a perpendicular recording system, bits of data are recorded magnetically perpendicular to the plane of the surface of the disk. The magnetic disk may have a relatively high coercivity material at its surface and a relatively low coercivity material just beneath the surface. A write pole having a small cross section and very high flux emits a strong, concentrated magnetic field perpendicular to the surface of the disk. This magnetic field emitted from the write pole is sufficiently strong to overcome the high coercivity of the surface material and magnetize it in a direction perpendicular to its surface. This flux then flows through the relatively magnetically soft underlayer and returns to the surface of the disk at a location adjacent a return pole of the write element. The return pole of the write element has a cross section that is much larger than that of the write pole so that the flux through the disk at the location of the return pole (as well as the resulting magnetic field between the disk and return pole) is sufficiently spread out to render the flux too week to overcome the coercivity of the disk surface material. In this way, the magnetization imparted by the write pole is not erased by the return pole.

Efforts to minimize track width and bit size when using perpendicular recording have focused on the formation of the write pole since the write pole defines both the track width and the bit size. Most desirably, the write pole should have a trapezoidal, or tapered shape in order to prevent adjacent track writing problems associated with skew. As those skilled in the art will recognize, skew occurs as an actuator arm swings the magnetic head to either extreme of its pivot range (ie. at the inner and outer portions of the disk). Such skew positions the head at an angle, which positions portions of the write pole outside of the desired track. Forming the write pole with a trapezoidal shape reduces such adjacent track writing.

Another attempt to improve write pole performance has focused on reducing remnance. Remnance is the slower than desired magnetization decay when the write current is turned off. Because a large amount of flux is being forced into a relatively small write pole, when the write current is turned off the magnetization of the write pole does not immediately cease, but continues for an undesirably long period of time. An approach to alleviate this has been to form the write pole as laminations of magnetic layers having very thin layers of non-magnetic material disposed therebetween.

Efforts to form the desired trapezoidal, laminated write poles have involved forming laminated layers of high Bsat magnetic material and then depositing a hard mask and a photoresist patterning mask. A material removal process such as reactive ion etch (RIE) has then been used, with the photoresist as a mask, to pattern the hard mask. Ion milling has then been used to remove the magnetic material there under. An angled ion milling process has then been used to form the desired tapered shape of the write pole.

A problem that has been encountered with the above, however, is that due to poor RIE selectivity between the hard mask and the photoresist mask layer, the photoresist mask layer must be made very thick. This is because a large amount of the photoresist must be consumed in the patterning of the hard mask. As increased data densities require smaller track widths, the tall photoresist structure becomes problematic. For example it would be desirable to use deep ultraviolet (deep U.V.) photolithography or e-beam photolithography, because these processes provide high resolution and allow a well defined small track width write pole to be constructed. However, in general, thicker resist degrades resolution due to worsening aerial imaging in the case of deep UV lithography, and increased blurring due to forward scattering in the case of e-beam lithography. In addition, since the aspect ratio (height to width) of a photoresist mask is limited by physical capabilities of the material, as track widths decrease the thickness must likewise decrease.

In addition, with the ever increasing need to increase data density and write speed, researchers have worked to develop magnetic writers that can avoid adjacent track writing and increase magnetic switching speed. One way to do this is to produces a write head with a trailing shield or a wrap around trailing shield. A trailing shield increases write speed by canting the magnetic field slightly away from vertical. This decrease the switching field, decreasing the time and field needed to switch the magnetic state of the writer from one state (ie into the medium) to the other state (ie. out of the medium). A wrap around shield provides a further advantage in that the shield absorbs stray magnetic fields, either from the write pole or from other write head structures, thereby preventing adjacent track writing. This is especially advantageous when the density of write tracks is increased to increase data density. However, the spacing between the trailing edge of the write pole and the trailing shield (trailing shield gap) is very critical in such a design. If the spacing is too small, write field will be lost to the shield, and if the spacing is too large, the write field will not be canted and the effectiveness of the trailing shield will be lost.

As the tracks of data are spaced closer together to provide increased data density, the track width must be very tightly controlled. Since the track width of the writer is defined by the write pole, the width of the write pole, especially at the trailing edge must be carefully controlled. In addition for write pole with trailing or a wrap around shield, the trailing edge must be clear and planar. Current masking and milling operations used to construct a write head consume an undesirable amount of the mask structure and sides of the write pole material and provide some inconsistency in track width definition.

Therefore, there is a need for a process for forming a write pole of a perpendicular write head that is compatible with the need to construct a trailing or a wrap around shield. Such a process would preferably allow for tight control of a gap thickness between the trailing edge of the write pole and the trailing shield. Such a process would also preferably be useful in constructing a write pole having a desired shape and having a very well controlled track width at the trailing edge of the write pole.

SUMMARY OF THE INVENTION

The present invention provides for the construction a well defined, narrow trackwidth write pole for use in a perpendicular magnetic write head. A magnetic layer is deposited, followed by a first hard mask, an image transfer layer and a second hard mask. A photoresist mask is then formed over the hard mask structure, and configured to define a trackwidth of the write pole. One or more material removal processes, such as reactive ion etching, may be performed to transfer the image of the photoresist mask onto the underlying first and second hard masks and image transfer layer.

The first hard mask may be constructed as a bi-layer or tri-layer structure, which may include two to three layers selected from the following materials: $Si_3N_4$, $SiO_2$, $Ta_2O_5$, Cr, Ta, Rh, alumina ($Al_2O_3$) and diamond like carbon (DLC). The choice of hard mask material may depend upon the type of write head being constructed and on whether the design incorporates a trailing shield, wrap around trailing shield or no shield at all. The first hard mask can function as an endpoint detection layer, a protection layer from ion mill, reactive ion mill, or CMP (CMP stop) as well as providing a hard mask for ion milling and has a preferential resistance to ion milling, in order to provide excellent track width control during an ion milling process used to define the write pole. Therefore, the first hard mask can provide one, some or all of these functions.

The second hard mask may be constructed of a material that can function as a bottom antireflective coating (BARC) as well as a hard mask and a RIE transfer layer. Depending on the wavelength of the exposure tool, such as 248 or 193 nm stepper, suitable materials for the second hard mask may include a mixture of $SiO_2$ and $Si_3N_4$ which may form a silicon oxy nitride. Another suitable material for the second hard mask may be $Si_3N_4$ or $Ta_2O_5$, which may be deposited as a single layer or as multiple layers depending upon the amount of opaqueness needed for better critical dimension (CD) control.

A third layer, which may be sandwiched between the first and second hard mask layers, can function as an image transfer layer. This middle layer (image transfer layer) can a non-photoreactive material such as a soluble polyimide film such as DURIMIDE®.

Another material removal process, such as ion milling may be performed to remove magnetic material not covered by the remaining mask layers in order to define the write pole. The ion milling may include an ion mill performed at an angle with respect to normal to form the write pole with a trapezoidal shape.

A method of manufacturing a magnetic write head using mask structures according to the present invention provides for the manufacture of a magnetic write pole having a very well defined shape and excellent track width control. These and other advantages and features of the present invention will be apparent upon reading the following detailed description in conjunction with the Figures.

BRIEF DESCRIPTION OF THE DRAWINGS

For a fuller understanding of the nature and advantages of this invention, as well as the preferred mode of use, reference should be made to the following detailed description read in conjunction with the accompanying drawings.

BEST MODE FOR CARRYING OUT THE INVENTION

The following description is the best embodiment presently contemplated for carrying out this invention. This description is made for the purpose of illustrating the general principles of this invention and is not meant to limit the inventive concepts claimed herein.

Figure 1:
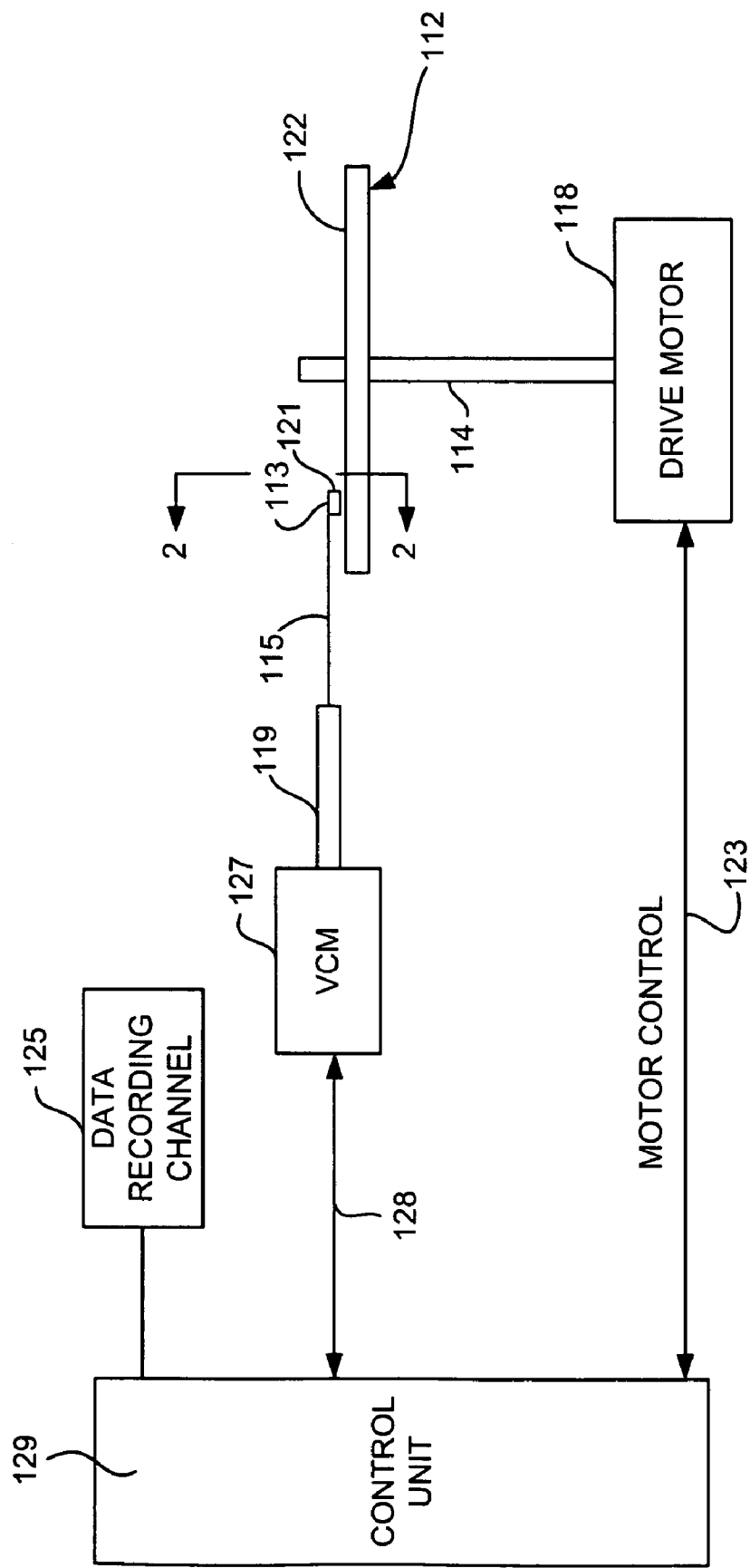
FIG. 1 is a schematic view of a magnetic storage system in which the present invention might be embodied.

Referring now to FIG. 1, there is shown a disk drive 100 embodying this invention. As shown in FIG. 1, at least one rotatable magnetic disk 112 is supported on a spindle 114 and rotated by a disk drive motor 118. The magnetic recording on each disk is in the form of an annular pattern of concentric data tracks (not shown) on the magnetic disk 112.

At least one slider 113 is positioned near the magnetic disk 112, each slider 113 supporting one or more magnetic head assemblies 121. As the magnetic disk rotates, the slider 113 is moved radially in and out over the disk surface 122 so that the magnetic head assembly 121 may access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on the slider. The air bearing thus counter-balances the slight spring force of suspension 115 and supports the slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

The above description of a typical magnetic disk storage system, and the accompanying illustration of FIG. 1 are for representation purposes only. It should be apparent that disk storage systems may contain a large number of disks and actuators, and each actuator may support a number of sliders.

Figure 2:
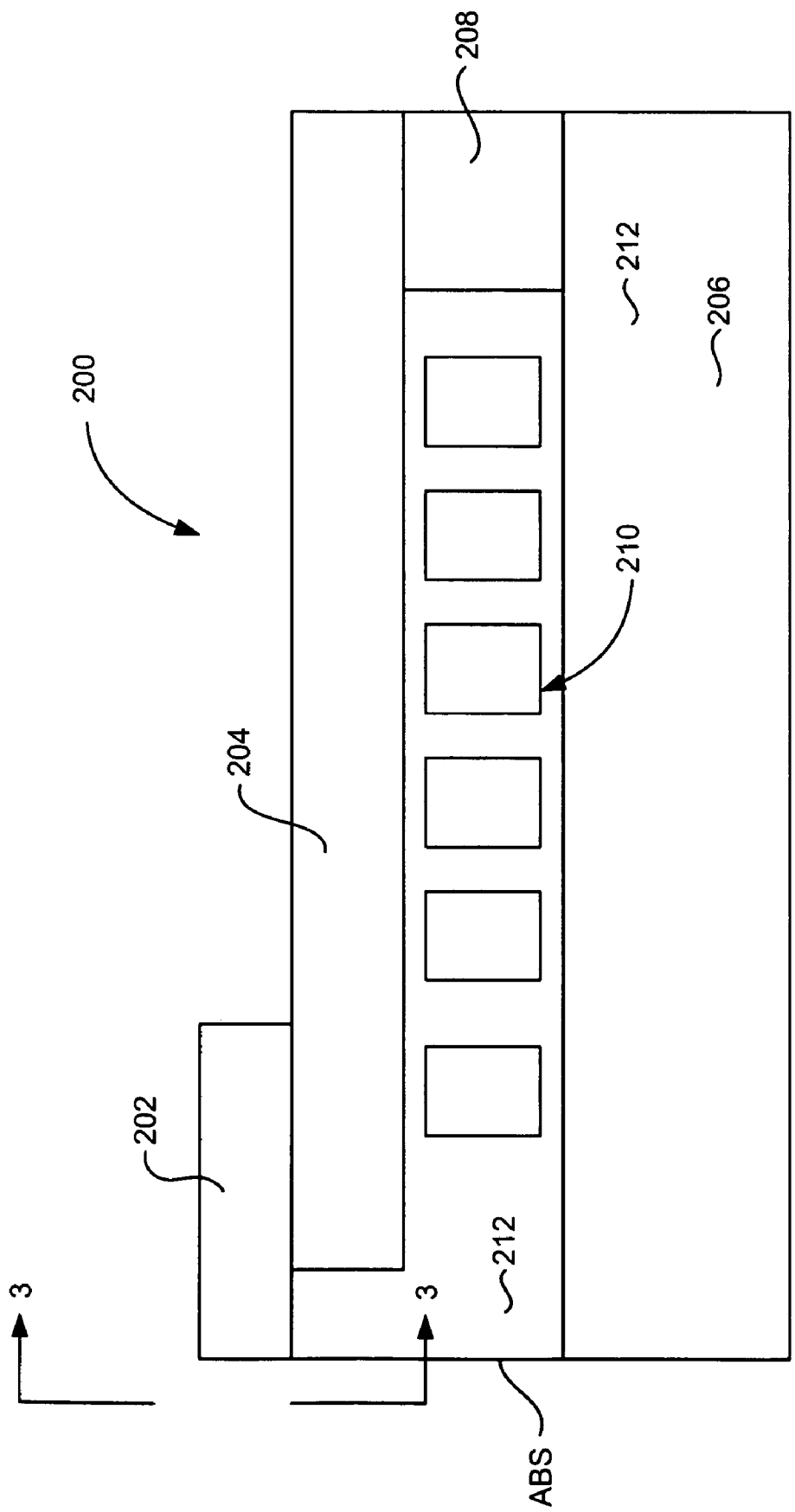
FIG. 2 is a cross sectional view of a perpendicular magnetic write element according to an embodiment of the present invention.

With reference to FIG. 2, a side cross section of magnetic element 200 for perpendicular recording can be seen. The write head includes a write pole 202 formed upon a flux guide layer 204. The write pole 202 and flux guide layer 204 are both constructed of magnetic materials. The write pole 202 is designed to contain a very large concentration of magnetic flux, and therefore, is preferably constructed of laminated layers (not shown) of high magnetic moment, high magnetic saturation (high Bsat) material such as CoFe. These magnetic layers are preferably separated by very thin layers of non-magnetic material such as chromium (Cr) and nickel chromium (CrNi) also not shown. The shaping layer 204 being much wider than the write pole (into the plane of the page) need not accommodate as high a magnetic flux concentration as the write pole 202 and can be constructed of for example NiFe or iron containing alloys.

The write element 200 also includes a return pole 206 which is magnetically connected with the shaping layer 204 by a magnetic back gap layer 208. The return pole and back gap layer can be constructed of a magnetic material such as for example NiFe iron containing alloys. An electrically conductive coil 210, formed of for example Cu passes between the shaping layer 204 and the return pole, being insulated there from by non-magnetic, electrically insulating fill material 210. Only a portion of the coil 210 is shown in FIG. 2 and is shown in cross section. Although not shown, the coil would wrap around the back gap 208. The non-magnetic, electrically non-conductive material 212 extends upward to separate the shaping layer 204 a desired distance from the ABS surface. As will be understood by those skilled in the art, the non-magnetic, electrically conductive fill material could be formed in several layers, and one or more chemical mechanical polishing processes may be performed between the deposition of each layer. In fact the fill 212 could be formed of layers of different materials such as for example, $Al_2O_3$, $SiO_2$ and photoresist.

Figure 3:
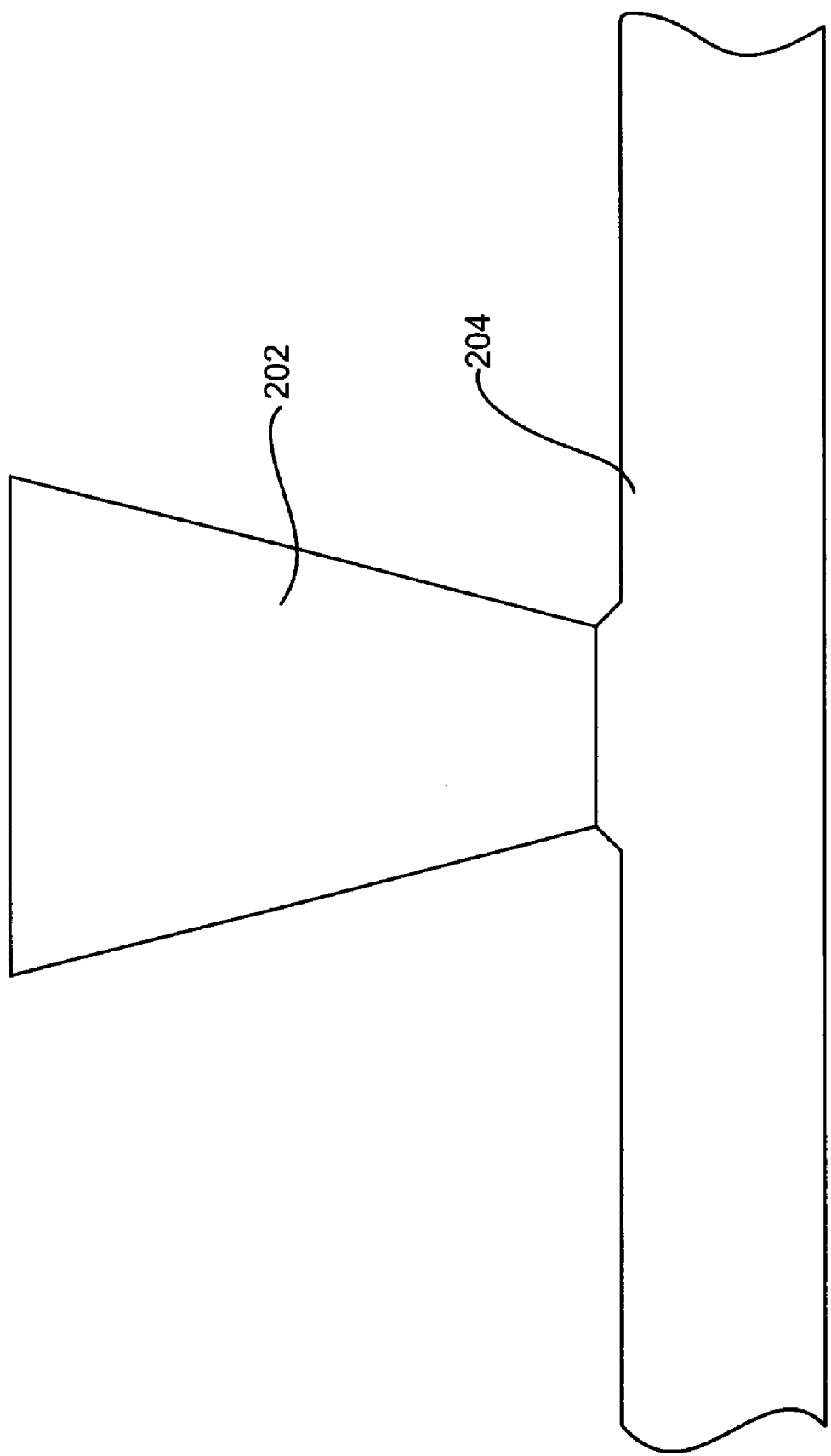
FIG. 3 is an ABS view, taken from line 3-3 of FIG. 2. illustrating a trapezoidal configuration of a write pole.

With reference now to FIG. 3, an ABS view of the write pole 202 shows the desired trapezoidal shape of the write pole, being wider at the top and tapering narrower at the bottom. FIG. 3, also shows the flux guide layer 204 for purposes of illustration. However, in actuality the flux guide layer would be recessed and disposed behind the fill material 212.

Figure 4:
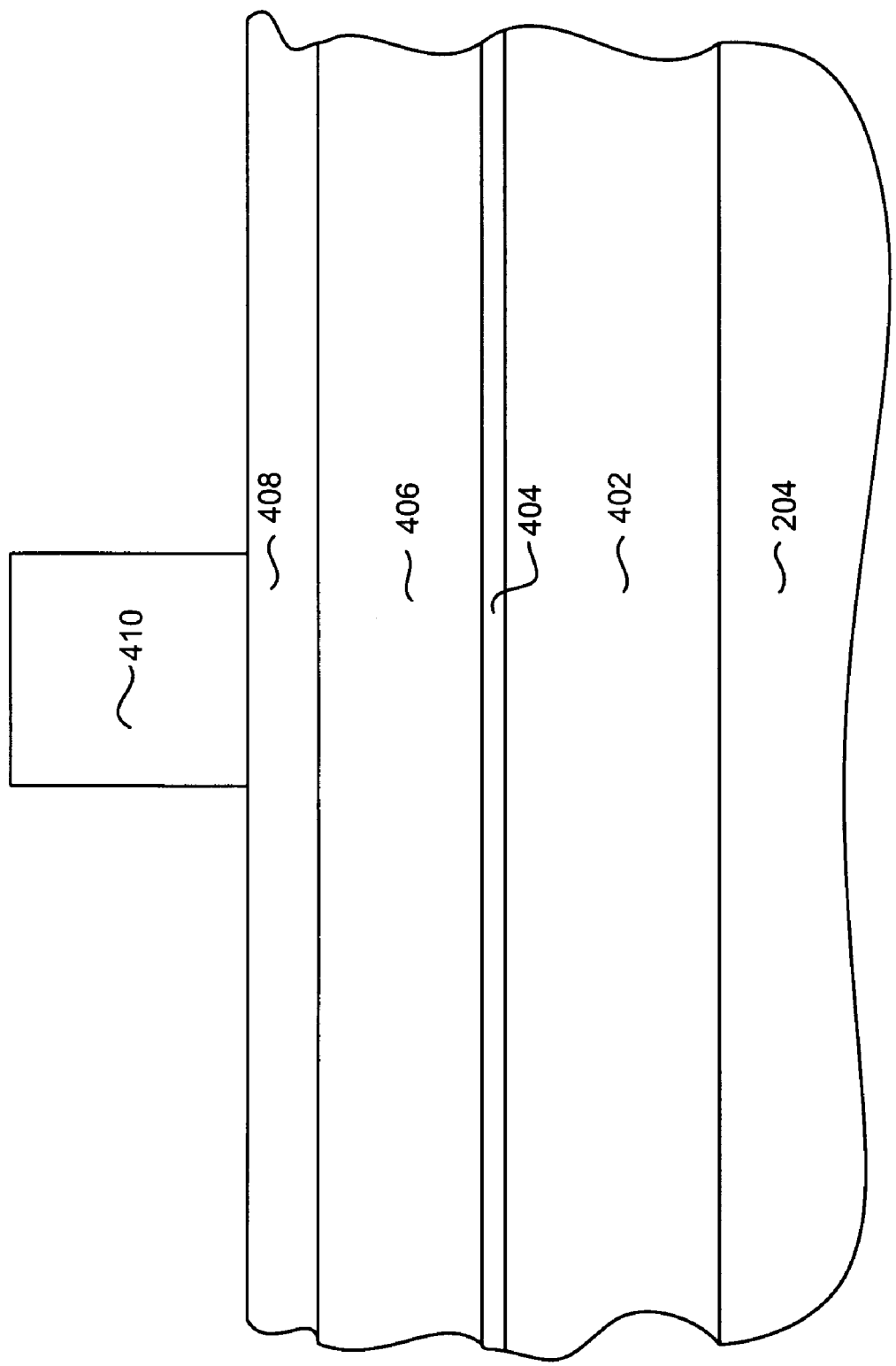
FIGS. 4-11 illustrate a method of constructing a write element as in FIGS. 2 and 3 by showing views of a write pole in various intermediate stages of manufacture.

With reference now to FIGS. 4-8, a process for constructing a narrow track width write pole 202 will be described. With particular reference to FIG. 4, the flux guide layer 204 is constructed according to processes familiar to those skilled in the art, such as frame plating, and can be constructed of a magnetic material such as NiFe. On top of the shaping layer 202, a layer of high magnetic moment, high Bsat material 402 is deposited. The magnetic material 402 is preferably formed as multiple laminated layers of high magnetic moment, high Bsat material such as CoFe separated by very thin layers of nonmagnetic material such as chromium (Cr) and nickel chromium (CrNi). The formation of such a material will be familiar to those skilled in the art and may comprise the alternating sputter deposition of chromium and nickel chromium and CoFe.

With continued reference to FIG. 4 a layer of physically hard CMP stop material 404 is deposited, preferably by sputtering. The CMP stop material may be for example diamond like carbon (DLC). Thereafter, a layer of first hard mask material 406 is deposited. The first hard mask material 406 is preferably a soluble polyimide film, which is sold by sold by Arch Chemicals, Inc. under the trade name DURIMIDE®. A second hard mask 408 is thereafter deposited above the first hard mask 406. The second hard mask could be constructed of for example $SiO_2$, mixture of $Si_3N_4$ and $SiO_2$ to produce $SiO_xN_y$ (an inorganic BARC), Ta2O5, or some similar material. In an alternate embodiment, the first hard mask 406 could be constructed of alumina ($Al_2O_3$) and the second hard mask 408 could be constructed of Ti.

After depositing the second hard mask layer 408 a layer of photoresist is spun on and patterned using photolithographic procedures familiar to those skilled in the art to produce a photoresist mask 410 having a width for defining a trackwidth of the sensor. Although examples of materials for the first and second hard mask layers 406, 408 have been described, those are only by way of example. More importantly, the second hard mask material 406 should be constructed of a material that is more readily removed by a first material removal process (an example of which will be described herein below) than is the photoresist mask. In a similar manner, the first hard mask material 406 should be selected of a material that will be removed at a faster rate than the second hard mask 408 when subjected to a second material removal process.

Figure 5:
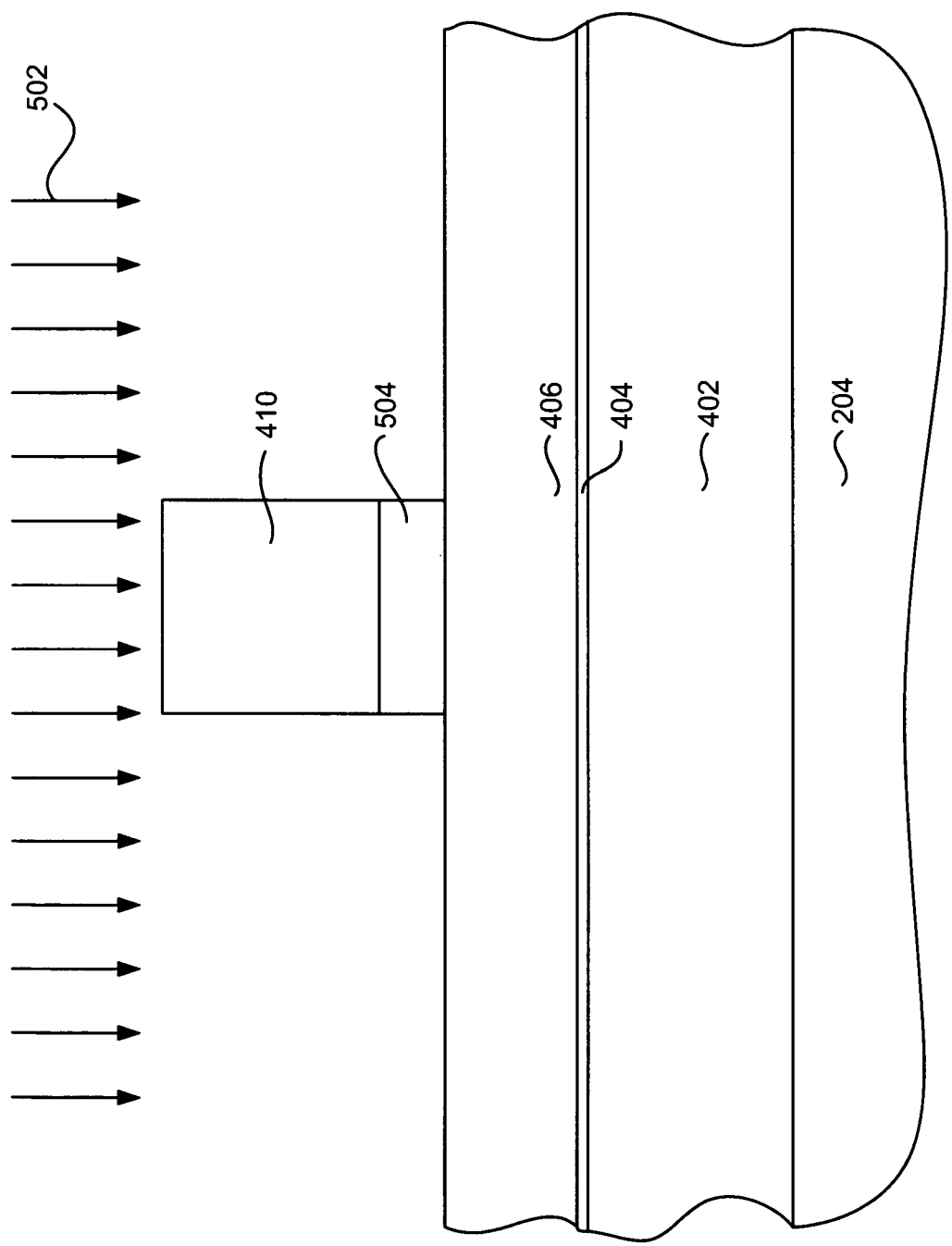

With reference now to FIG. 5, with the photorsesist mask 410 formed, a first material removal process 502 is performed. While the first material removal process could be one of several such processes, it preferably includes a reactive etch performed in a fluorine containing atmosphere, such as $CF_4$ and/or $CHF_3$. The first material removal process patterns the photoresist mask 410 onto the hard mask material layer, removing exposed portions of the second hard mask material layer 408 leaving a second hard mask 504.

Figure 6:
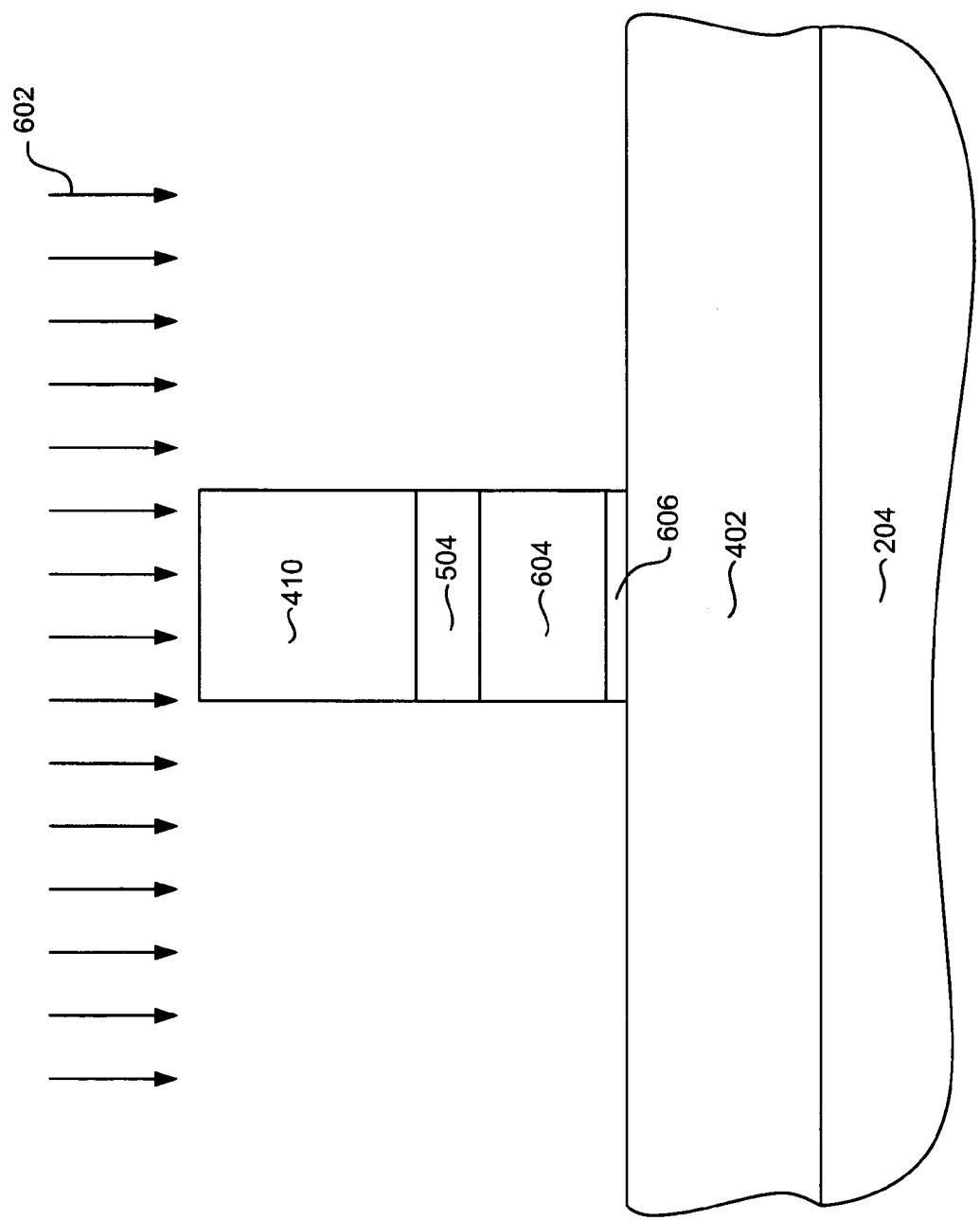

With reference now to FIG. 6, a second material removal process 602 is performed. The second material removal process 602 could include a reactive ion etch using an oxygen based atmosphere such as $O_2$ or $CO_2$. The second material removal process 602 removes portions of the first hard mask material layer 406 and the CMP stop layer material 404 that are not covered by the second hard mask 504 and photoresist mask 410 producing a first hard mask 604 and CMP stop layer 606.

Figure 7:
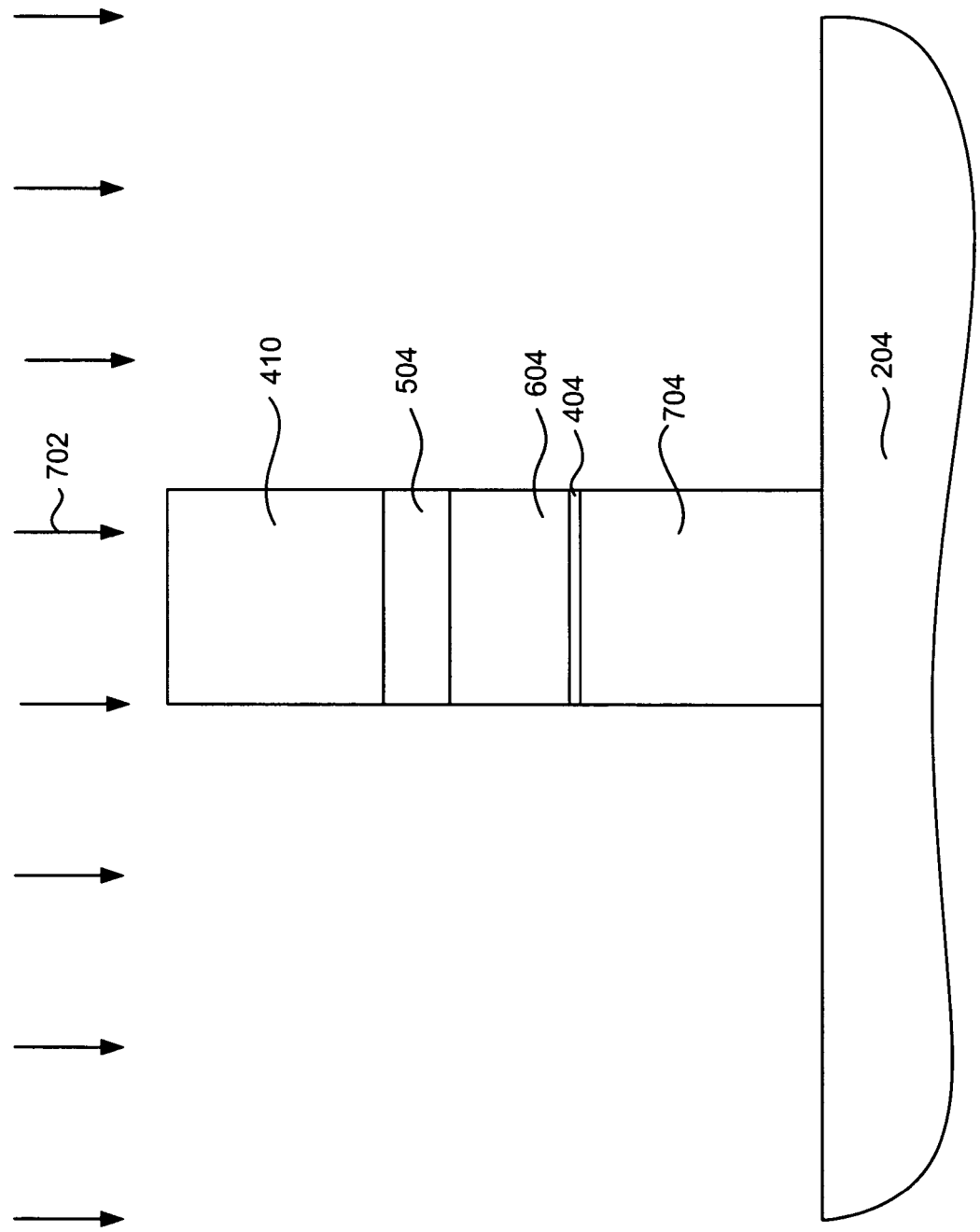

Thereafter, with reference to FIG. 7, a third material removal process 702 is performed to remove portions of the magnetic layer 402 not covered by the hard masks 604, 504, 404, and photoresist mask 410. The third material removal is preferably an ion milling process performed in a direction normal to the upper surface of the magnetic layer 402 (i.e. straight down) as indicated by arrows 702. This ion milling results in a write pole 704 having substantially vertical side walls.

Figure 8:
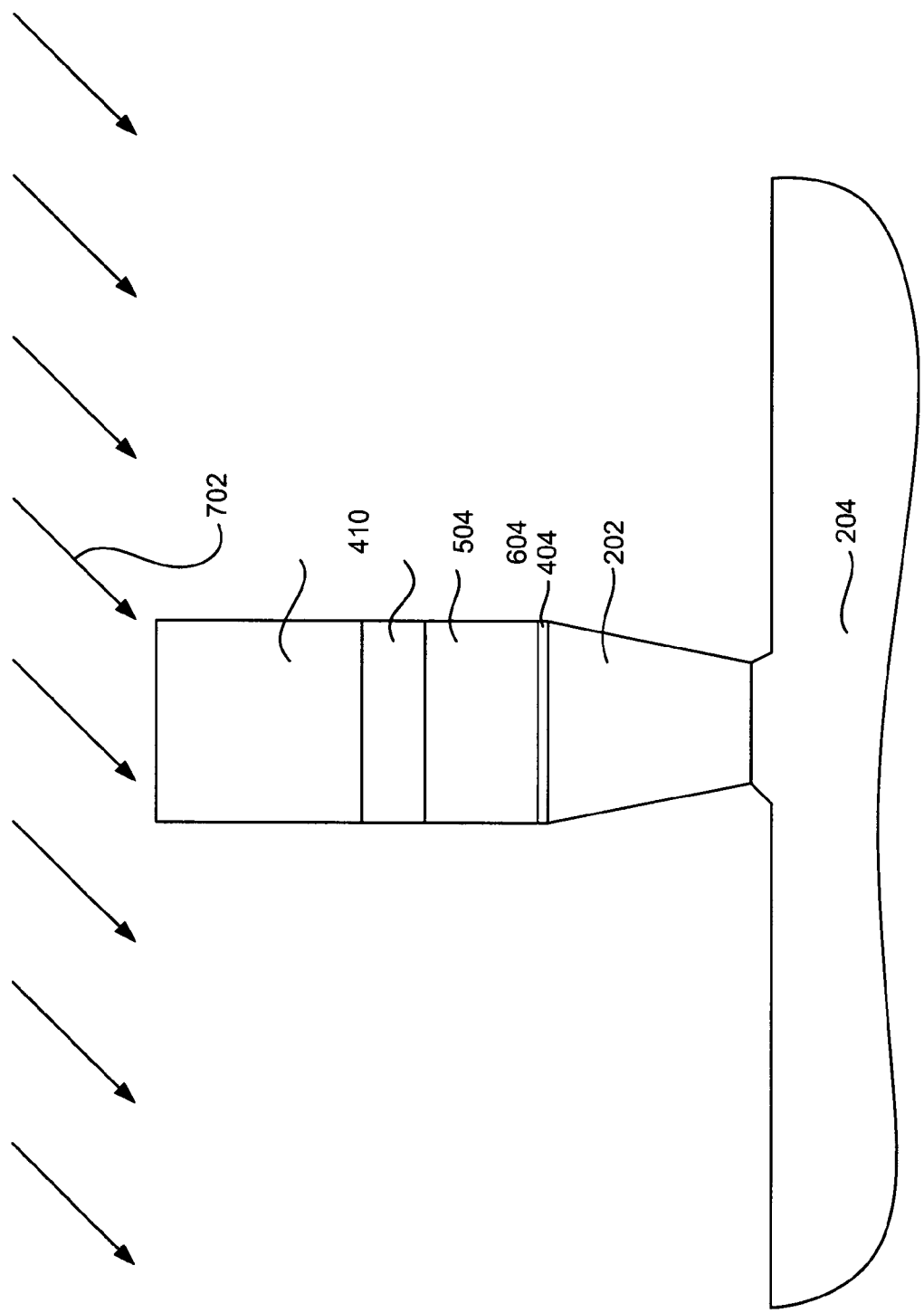

With reference now to FIG. 8, in order to form the write pole with the desired trapezoidal shape as fourth material removal process can be performed at an angle relative to a normal to the upper surface of the magnetic layer 402. The fourth material removal process is preferably an ion milling operation performed at an angle 30 to 60 degrees relative to normal.

Figure 9:
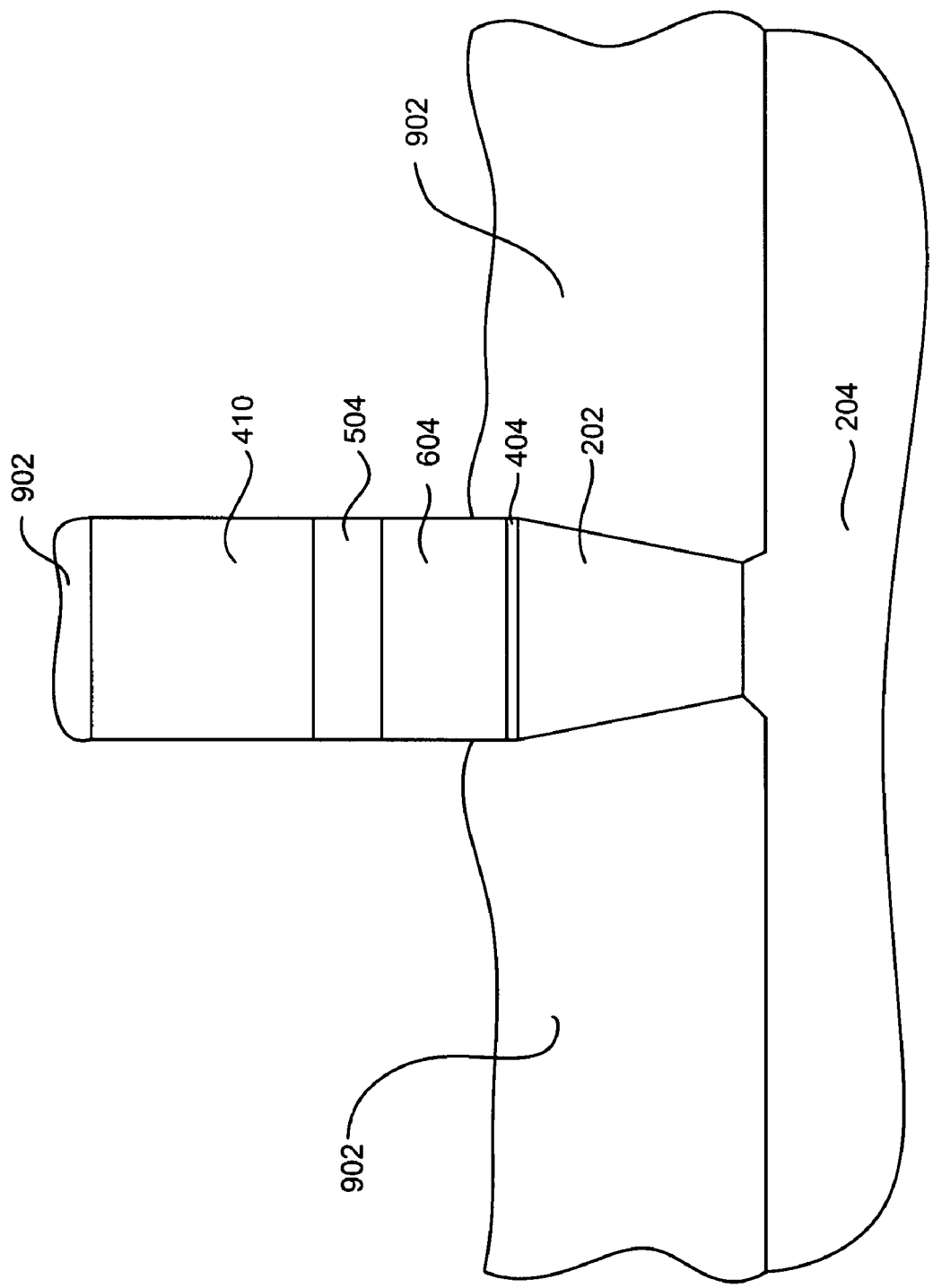

With reference now to FIG. 9, after forming the write pole 202 with the appropriate trapezoidal shape, a layer of dielectric material 902 is deposited. The dielectric material can be for example alumina $Al_2O_3$ or some other dielectric, non-magnetic material. The dielectric material is deposited to extend above the top of the write pole 202.

Figure 10:
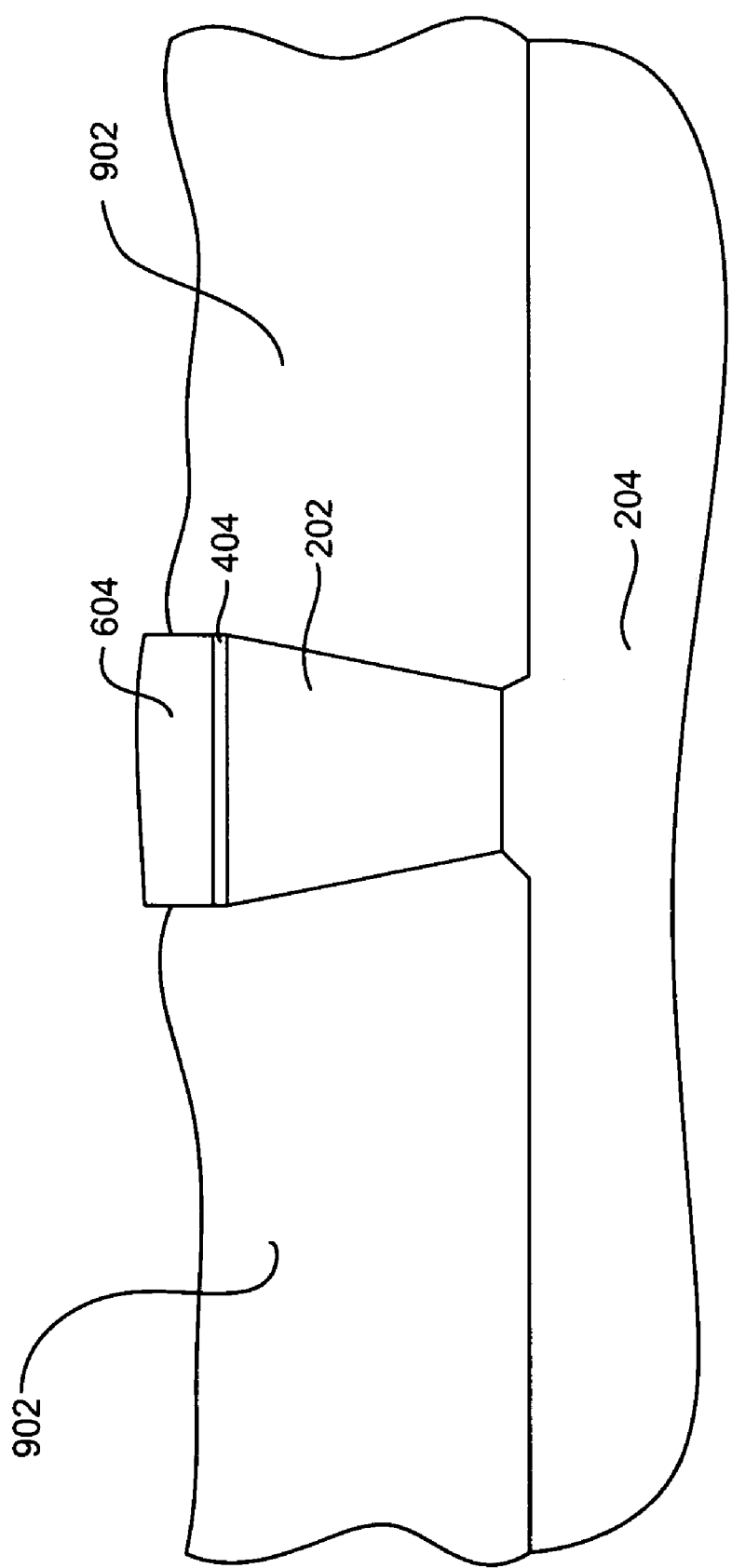

With reference to FIGS. 9 and 10, the first and second hard mask layers 604, 504 and photoresist mask 410 are lifted off. The mask layers 604, 504, 410 are preferably lifted off using a hot NMP (N-methyl pyrrolidone) solution. The first mask is preferably constructed of a material (such as DURIMIDE®) that is readily dissolved in such a lift off solution. The use of a bilayer hard mask structure 604, 504 allows the first hard mask 604 to be constructed much thicker than the second hard mask 504. The more substantial side walls of the thicker first hard mask layer 604 provide more surface with which the lift off solution can react and therefore facilitates lift off.

Figure 11:
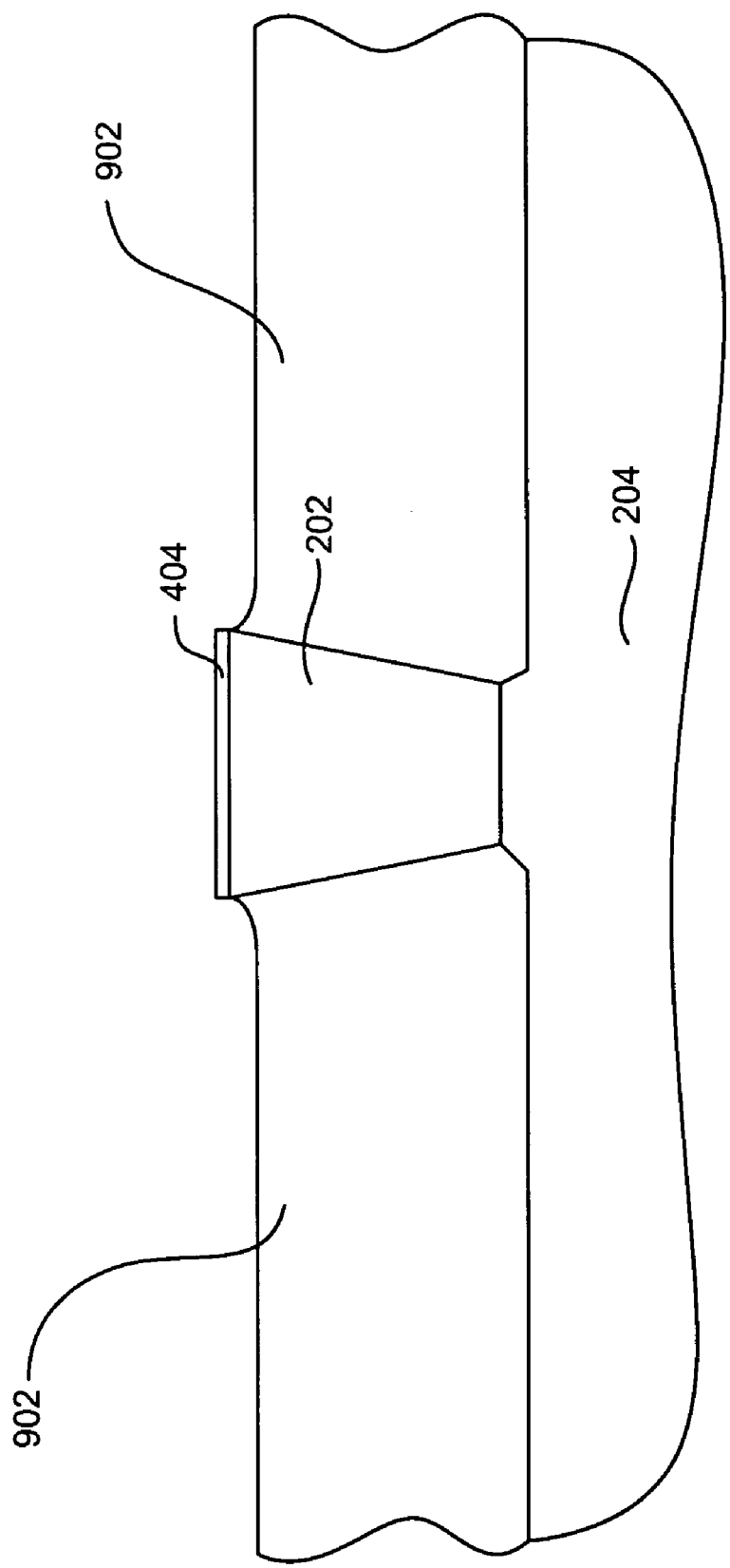

With reference now to FIG. 11, a chemical mechanical polishing process can be performed to planarize the upper surface of the dielectric layer 902. Using the CMP stop layer 404 to determine the end point of the CMP process creates a planar surface 1102 that is coplanar with the upper surface of the CMP stop layer 404. Another method to remove the hard masks is to use an ion mill approach. In this approach, the CMP stop layer is replaced with a material for ion mill endpoint detection such as Cr, Ta, Rh, Ir, $Ta_2O_5$, $SiO_xN_y$, $Si_3N_4$, etc. With reference to FIG. 9, after depositing a dielectric material 902, the hard masks are removed by using reactive ion milling. The endpoint material is used to signal the hard masks are removed.

Figure 19:
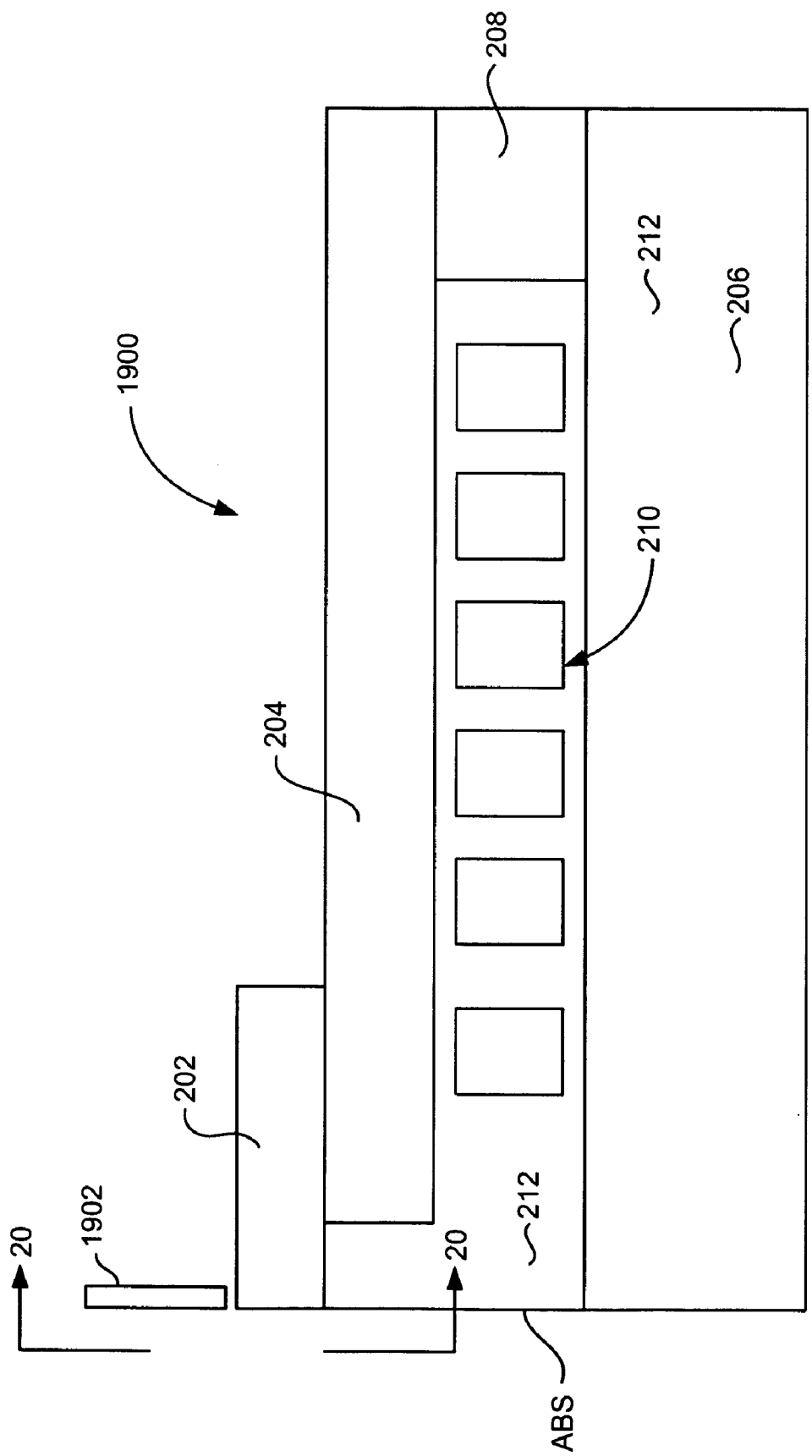
FIG. 19 is a cross sectional view of a perpendicular magnetic write head having a trailing shield.
Figure 20:
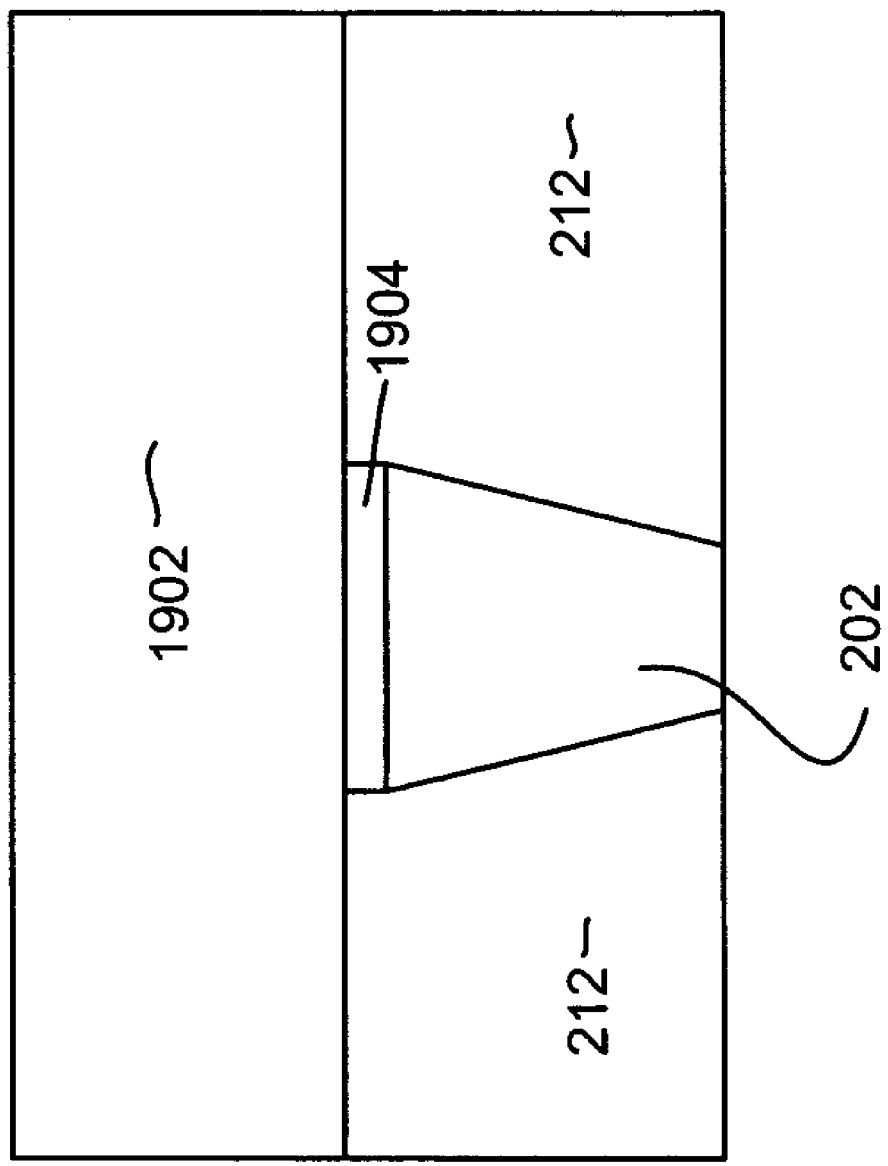
FIG. 20 is an ABS view of the write head of FIG. 19.
Figure 21:
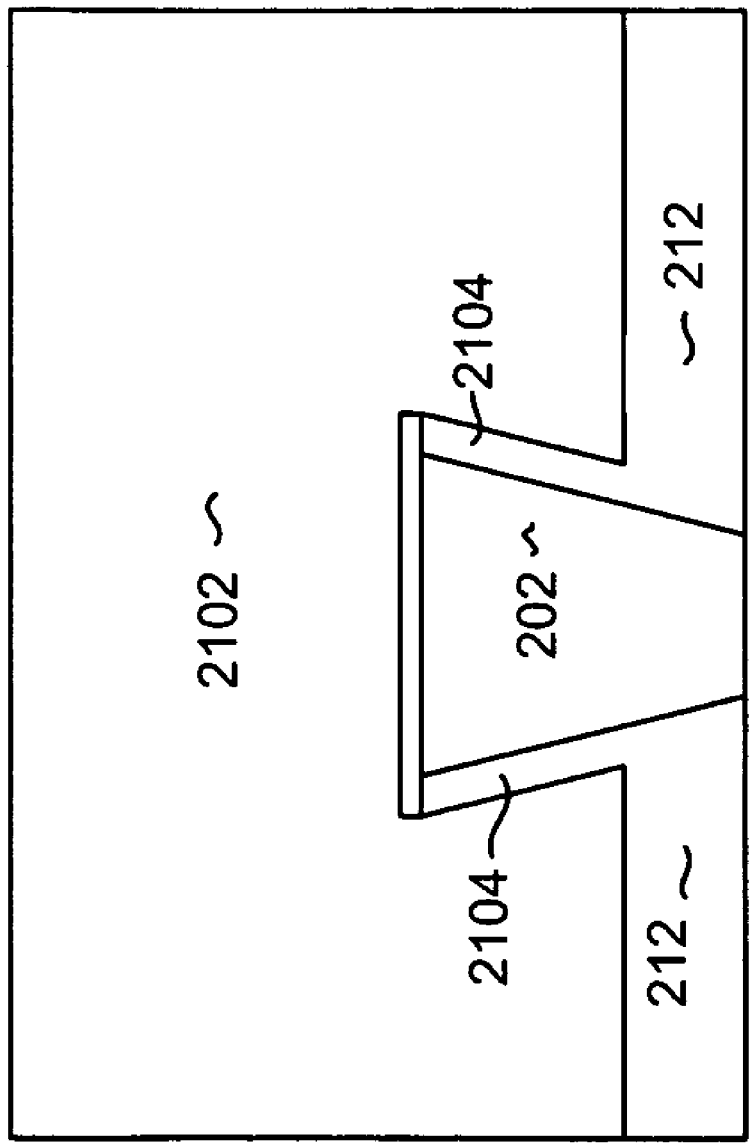
FIG. 21 is an ABS view of a write head having a wrap around trailing shield.

Trailing Shield and Wrap Around Trailing Shield:

With reference to FIGS. 19-21, an alternate embodiment of a write pole includes a wrap around or trailing shield design for improved magnetic performance. With particular reference to FIG. 19, a cross section of a write head 1900 includes a structure similar to that described with reference to FIG. 2, except that the write head 1900 includes a trailing magnetic shield 1902. The trailing shield can be constructed of, for example NiFe or some other magnetic material. FIG. 20 shows an enlarged ABS view of the write pole 202 and the trailing shield 1902. As can be seen in FIG. 19, the trailing shield 1902 is separated from the trailing edge of the write pole 202 by a trailing gap 1904. The trailing gap 1904 can be constructed of several non-magnetic materials, such as alumina, etc. The trailing shield 1904 can improve magnetic performance by attracting the magnetic write field from the write pole 202. This causes the write field to be canted a certain amount in the trailing direction, and this canting of the write field improves write performance by decreasing the switching field. With reference now to FIG. 21, another embodiment includes a wrap around trailing shield 2102. As can be seen the wrap around trailing shield has a trailing portion, but also has first and second side portions that extend down near the sides of the write pole 202. The side shields prevent adjacent track writing which might otherwise be caused by stray magnetic fields, either from the write pole itself or from other write head structures. The side portions are preferably separated from the write pole 202 by side gaps 2104 that are about twice the thickness of the trailing gap, and may be filled with a non-magnetic material such as alumina or some other material. The side portions may extend all the way down to or beyond the leading edge of the write pole 202 or may terminate at some point between the leading and trailing edges.

In addition to the trapezoidal shaped write pole 202 shown in FIGS. 20 and 21, the write pole 202 as viewed from the ABS could have other configurations. For example, the write pole could have a notched, constant width portion at the trailing edge that extends some desired distance from the trailing edge, and a tapered portion extending the remaining distance to the leading edge. Such a design would resemble a hybrid between a trapezoidal write pole and a rectangular write pole.

Figure 12:
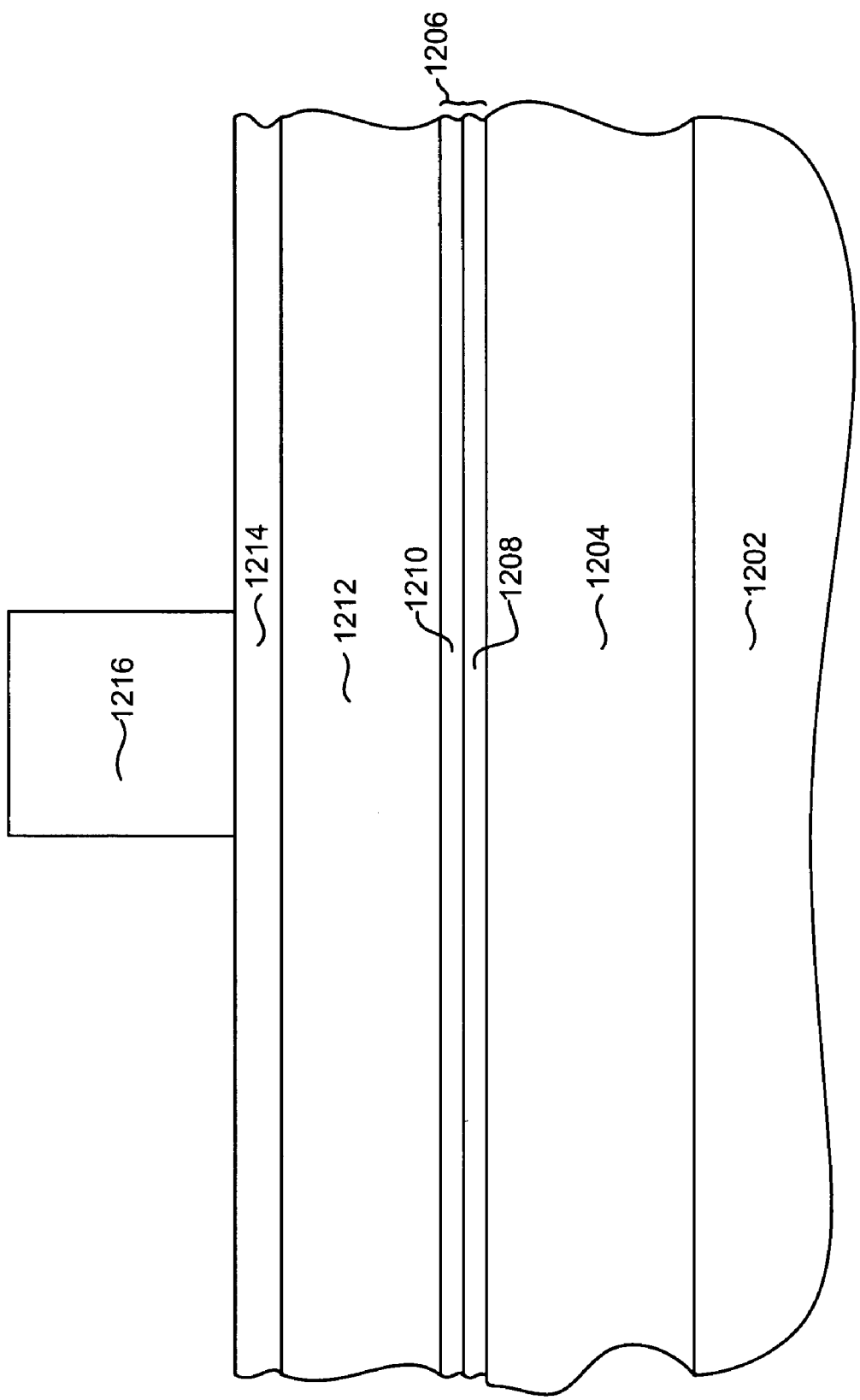
FIGS. 12-18 illustrate a method of constructing a write element according to an alternate embodiment of the invention.

Bi-Layer First Hard Mask and BARC Second Hard Mask:

With reference now to FIGS. 12-18 a method of manufacturing a write pole according to another embodiment is described. This method facilitates construction of the shielded write heads described with reference to FIGS. 19-21 by providing for a smooth surface at the trailing edge on which to form a desired trailing gap. With particular reference to FIG. 12, a substrate 204 is provided. The substrate 1202 may include, for example a portion that includes a magnetic shaping layer or flux guide, and portion that includes a non-magnetic, electrically insulating fill material, the shaping layer and fill material both having smooth coplanar surfaces. A layer of magnetic write pole material 1204 is then deposited over the substrate 1202. The write pole material can be a single layer of high Bsat material such as CoFe or $Ni_{50}Fe_{50}$ or some other material. Alternatively, the write pole material 1204 can be constructed as a laminate structure including alternating deposited layers of magnetic material such as CoFe or NiFe separated by thin non-magnetic layers such as Cr and/or CrNi. A first hard mask structure 1206 is then deposited over the magnetic pole material 1204. The first mask structure 1206 can be a bi-layer mask structure including a first layer 1208 and a second layer 1210. The first layer 1208 can be alumina ($Al_2O_3$) and the second layer constructed of Rh. Or, the first layer 1208 can be constructed of carbon such as diamond like carbon (DLC) and the second layer constructed of Rh. Alternatively, the first layer 1208 can be DLC and the second layer 1210 constructed of alumina. Also, the order of these layers may be reversed. Therefore, the bi-layer first hard mask 1206 may have a structure of: alumina/Rh; Rh/alumina; DLC/Rh; Rh/DLC; DLC/alumina; or alumina/DLC. In addition, Rh can be substituted with Cr, Ta, Ir, $Ta_2O_5$, $SiO_xN_y$, $Si_3N_4$, etc. Therefore the hard mask 1206 can have a structure of DLC/X or X/DLC, where X is Cr, Ta, Ir, $Ta_2O_5$, $SiO_xN_y$, $Si_3N_4$, Rh etc. The hard mask 1206 may also be embodied in a tri-layer structure, such as alumina/X/alumina where X is Cr, Ta, Ir, $Ta_2O_5$, $SiO_xN_y$, $Si_3N_4$, Rh, etc. With continued reference to FIG. 12, an image transfer layer 1212 is deposited over the first hard mask 1206. The image transfer can be, for example, a polyimide material such a DURIMIDE®. The image transfer layer provides sufficient mask thickness to ensure that there will be sufficient mask material to withstand an ion milling process used to define the write pole, as will be described in greater detail below.

A second hard mask layer 1214 is deposited over the image transfer layer 1212. The second hard mask 1214 is constructed of a material that can function as a bottom antireflective coating (BARC) as well as a hard mask. Suitable materials include a mixture of $SiO_2$ and $Si_3N_4$ also known as silicon oxynitride, or can be constructed of tantalum oxide $Ta_2O_5$. These materials and the thicknesses at which they are deposited will be discussed in greater detail below.

A photo mask 1216 is then constructed over the second hard mask layer 1214. The photo mask 1216 is constructed by depositing a layer of photosensitive material such as photoresist or thermal image resist (TIS). The photosensitive material is the photolithographically patterned to form a mask 1214 having a width that is chosen to define a track width of the write pole 202 (FIG. 3).

Constructing the second hard mask layer of a material that can function as a BARC improves the photolithography of the photoresist layer. The BARC properties of the second hard mask 1214 prevents light from being reflected off of the surface of the image transfer layer 1212 (ie. off of the interface between the image transfer layer 1212 and the hard mask 1214) during the photolithographic patterning process used to form the photo mask 1216. If this light were allowed to reflect off of the surface of the image transfer layer 1212, this light would expose unintended portions of the photosensitive material layer 1216, resulting in a misshapen photomask 1216 having an undesired width. Therefore, the hard mask 1214 should be sufficiently opaque to prevent a significant amount of light from passing through the hard mask 1214 and reflecting off of the image transfer layer 1212.

As mentioned above, the second hard mask 1214 can be constructed of a mixture of $SiO_2$ and $Si_3N_4$ (silicon oxy nitride). The ratio of $SiO_2$ and $Si_3N_4$ can be adjusted to provide the top hard mask 1214 with a proper, desired reflectivity. Also as mentioned above, the hard mask can be constructed of $Ta_2O_5$ (tantalum oxide). $Ta_2O_5$ is opaque to light having a wavelength of about 248 nm, and can be used as a BARC hard mask when light of that wavelength is used to pattern the photomask 1216. In order to pattern a photomask 1216 having a narrow width it is necessary to perform the photolithography using a shorter wavelength of light for higher resolution. For example, a wavelength of 193 nm may be used to perform a high resolution photolithographic patterning of the photo mask 1216. While a single layer hard mask constructed of $T_2O_5$ is opaque at light of 248 nm or greater, such a mask is not sufficiently opaque to light having a wavelength of, for example 193 nm to perform as an effective BARC. Therefore, if shorter wavelength light, such as 200 nm or less (193 nm for example), is to be used for the photolithography, a hard mask 1214 consisting of multiple layers of $Ta_2O_5$ can be used. For example, the hard mask 1214 may be constructed of 2, 3 or more layers of $Ta_2O_5$, the interfaces between the layers providing additional opaqueness to the hard mask 1214. In such case, the number of layers of $Ta_2O_5$ is chosen so that the hard mask 1214 is opaque to the wavelength of light used when the light has a wavelength of 200 nm or less.

Figure 13:
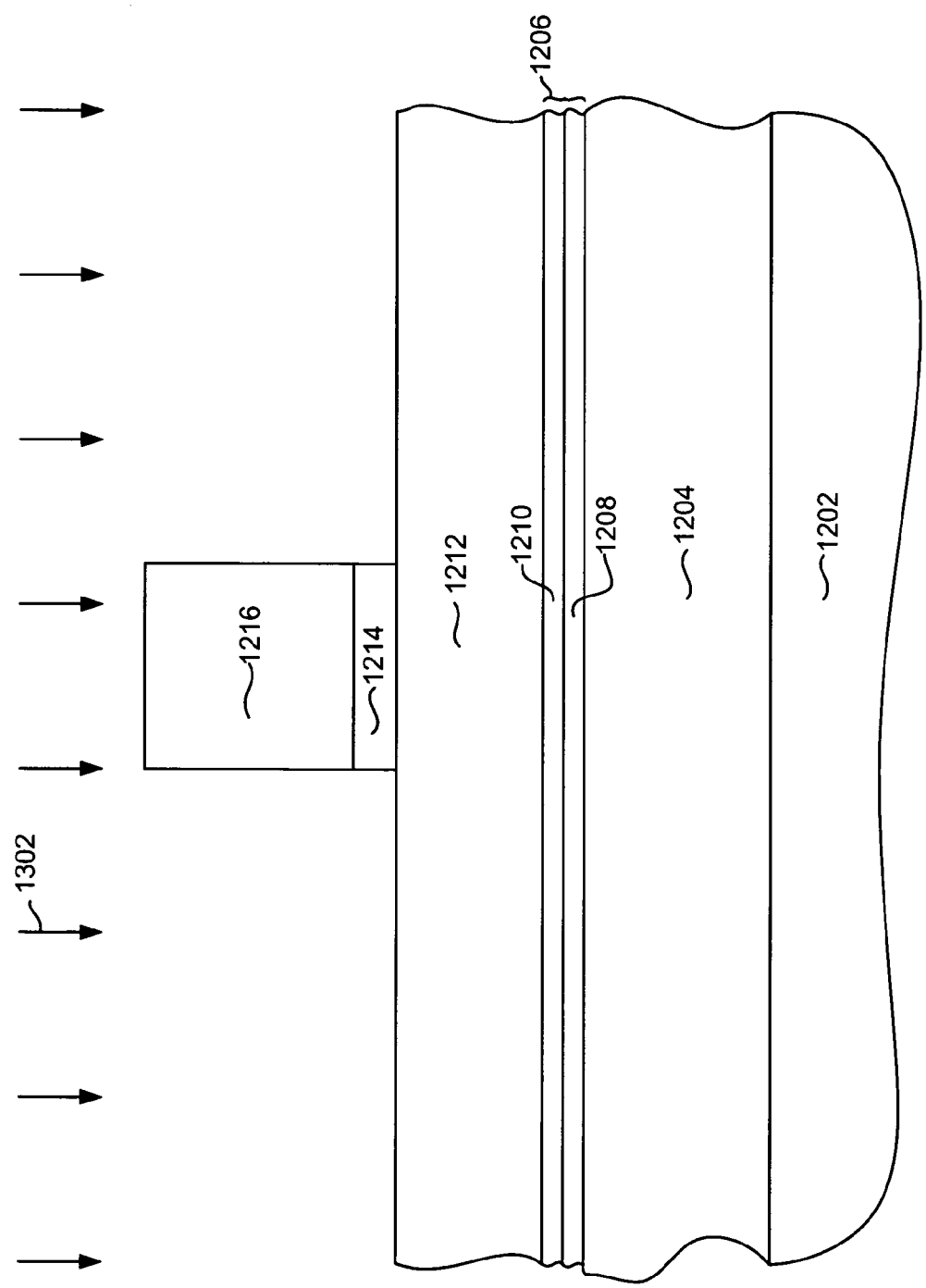

With reference now to FIG. 13, a reactive ion etch (RIE) 1302 is performed to transfer the image of the photo mask 1216 into the hard mask layer 1214. The RIE 1302 can be performed using a chemistry (in an atmosphere) selected to selectively remove the material of the hard mask 1214. For example, the RIE 1302 can be used in a fluorine containing atmosphere, such as an atmosphere that contains $CF_4$ or $CHF_3$. The RIE 1302 transfers the image of the photo mask 1216 onto the underlying top hard mask layer 1214 by removing portions of the hard mask 1214 that are not protected by the photo mask 1216.

Figure 14:
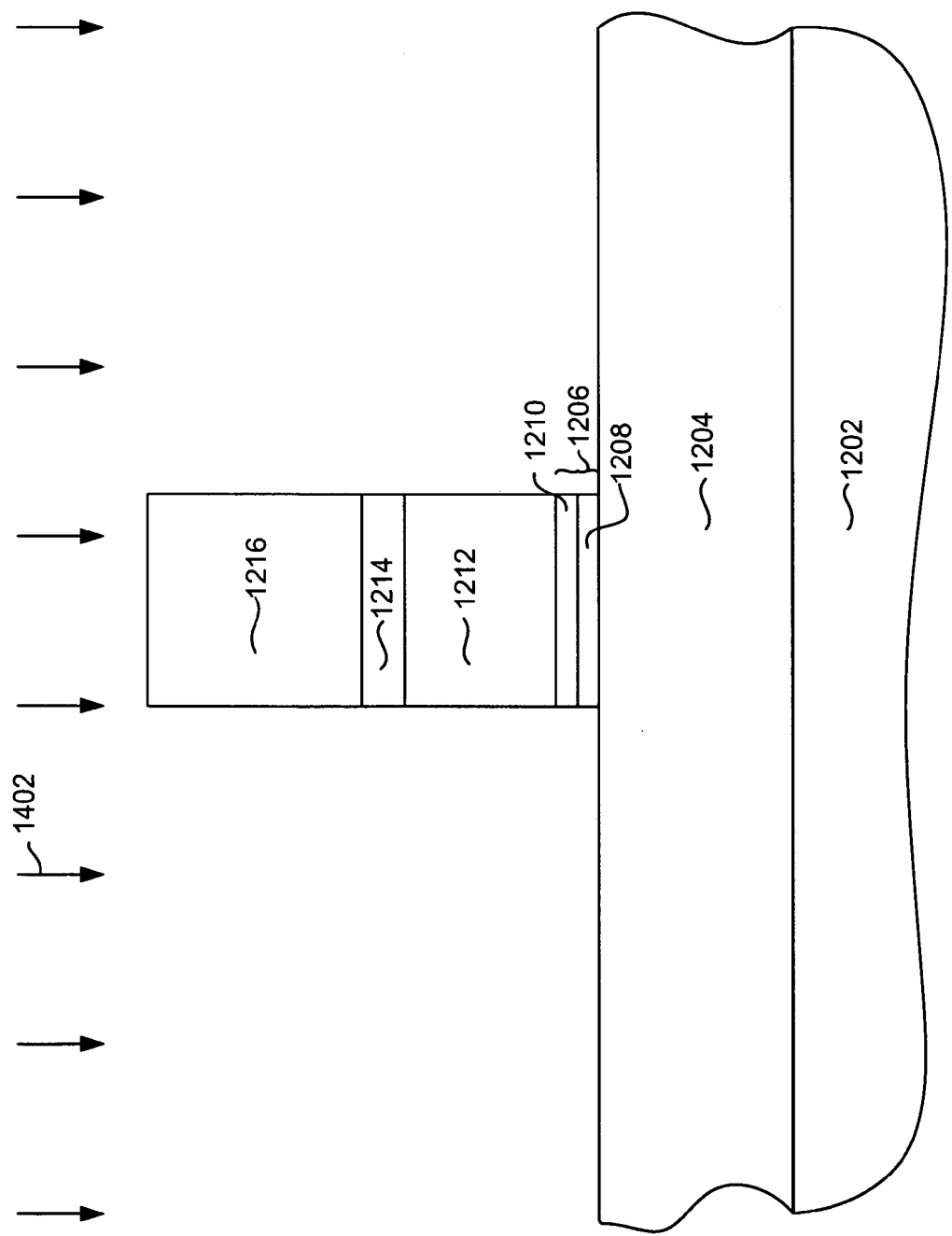

With reference now to FIG. 14, a second RIE or other material removal process 1402 is performed to transfer the image of the top hard mask 1214 into the image transfer layer 1212 and bottom (first) hard mask structure 1206. For example, If DLC is the first top layer of the hard mask 1206, then a reactive ion etch (RIE) would be performed, preferably using an oxygen atmosphere such as $O_2$ or $CO_2$ to remove the DLC layer. If not, 1206 can be removed in the process of forming the write pole. For example, if the top layer is alumina, reactive ion mill with $CHF_3$/Ar can be used to etch the alumina then the ion mill process is changed to Ar only to form the write pole. If the material is Ir, Rh, Cr, SiO2, Ta2O5, Ta, Si3N4, SiOyNx, ion mill with Ar can be used to etch through these material and the laminate structures. Therefore, the second material removal process 1402 can be performed sufficiently to remove portions of the image transfer layer 1212 and possibly the bottom hard mask layer 1206 that are not protected by top (second) hard mask 1214 and photo mask 1216.

Figure 15:
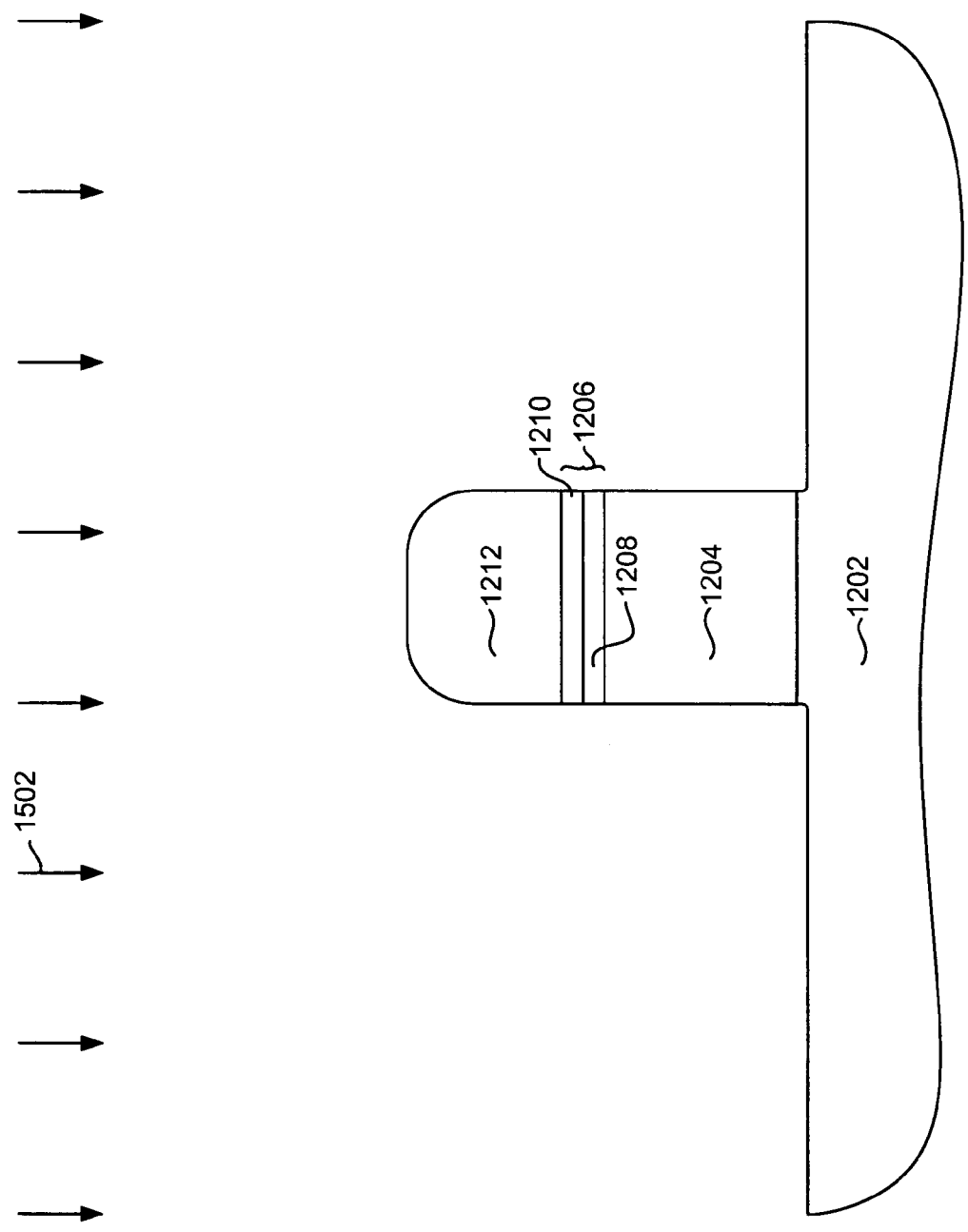

With reference now to FIG. 15, a first ion mill 1502 is performed to remove portions of the magnetic pole material 1204 that are not protected by the mask structures 1204, 1206, 1208, 1212. The ion mill process 1502 may remove most or all of the top hard mask 1214 and photo mask 1216 (FIG. 14), leaving a portion of the image transfer layer 1212. This first ion mill 1502 is performed substantially vertically and can be used to define a nominal width write pole. In other words, the first ion mill 1502 is peformed at an angle of, for example 0-20 degrees with respect to a normal to the surfaces of the layers 1202-1212.

Figure 16:
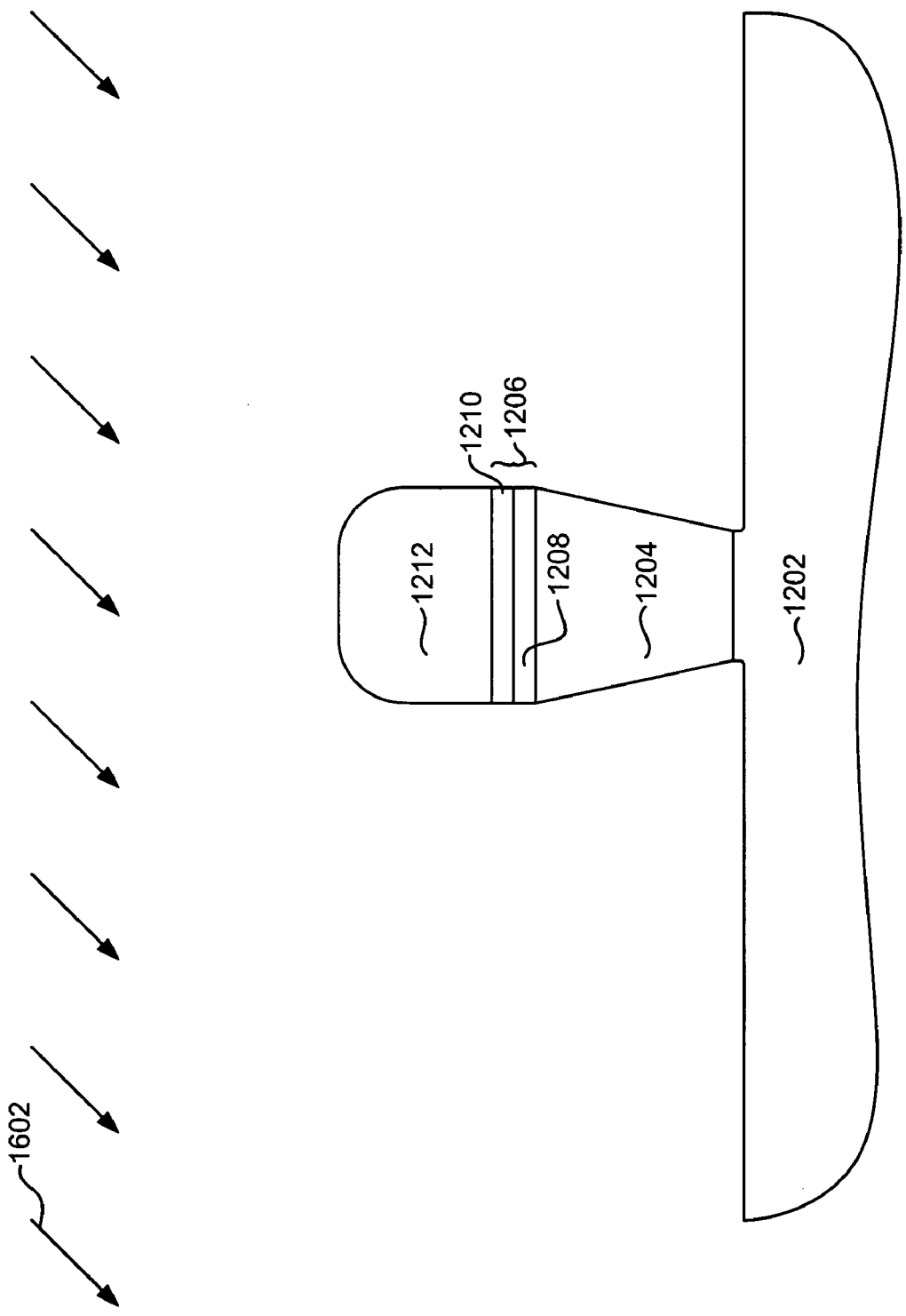

As mentioned above, it is desired that the write pole have a trapezoidal shape to prevent skew related adjacent track interference. With reference to FIG. 16, a second ion mill 1602 is performed at a glancing angle relative to normal (relative to a normal to the surface of the layers 1202-1212). This second ion mill 1602 can be performed at an angle of, for example 30-90 degrees with respect to normal. The bi-layer mask 1206 has a desired selectivity to removal by the ion mill processes 1502, 1602 that it provides an extremely well defined trapezoidal write pole 202 having a very well controlled track width.

Figure 17:
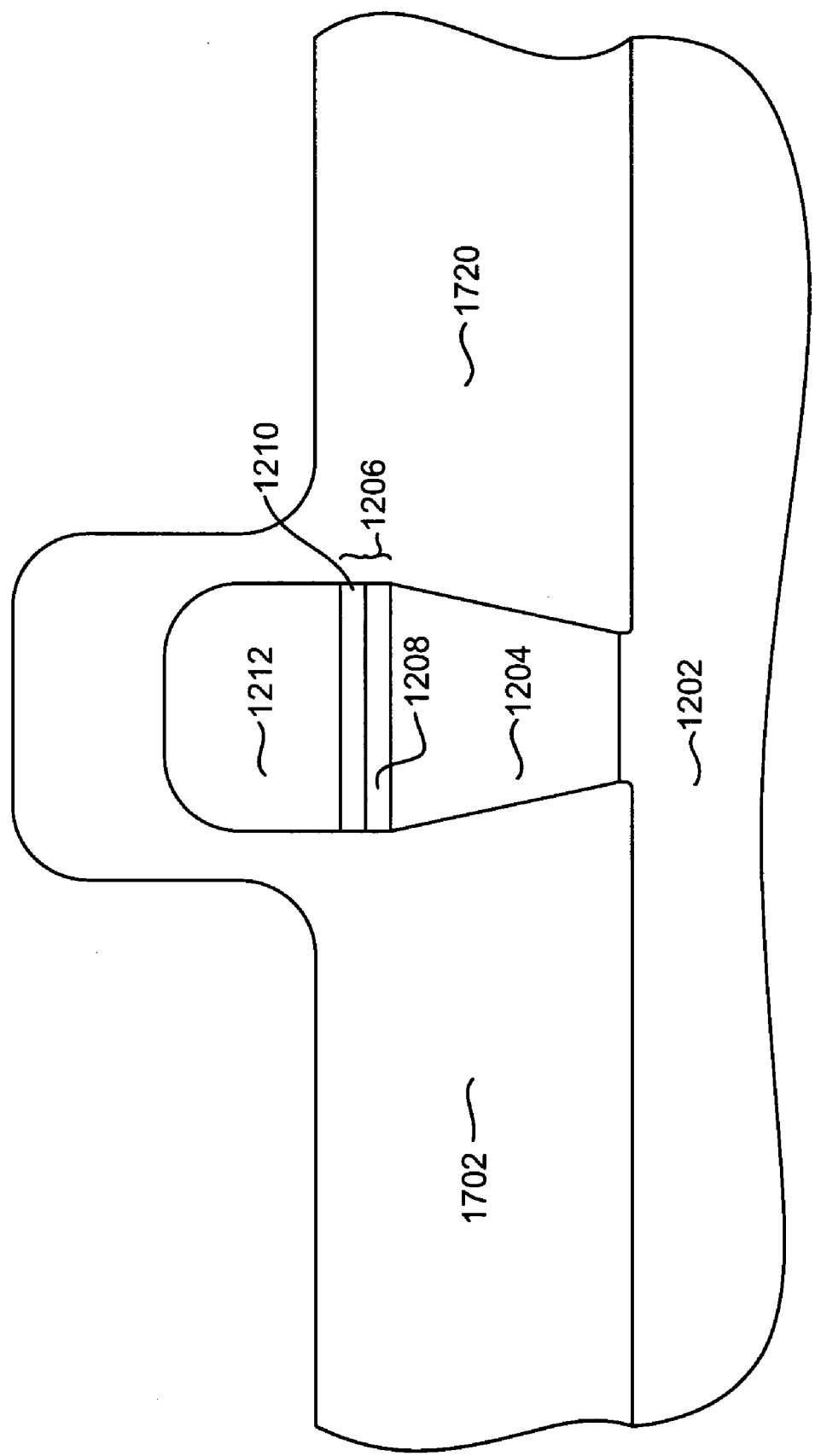
Figure 18:
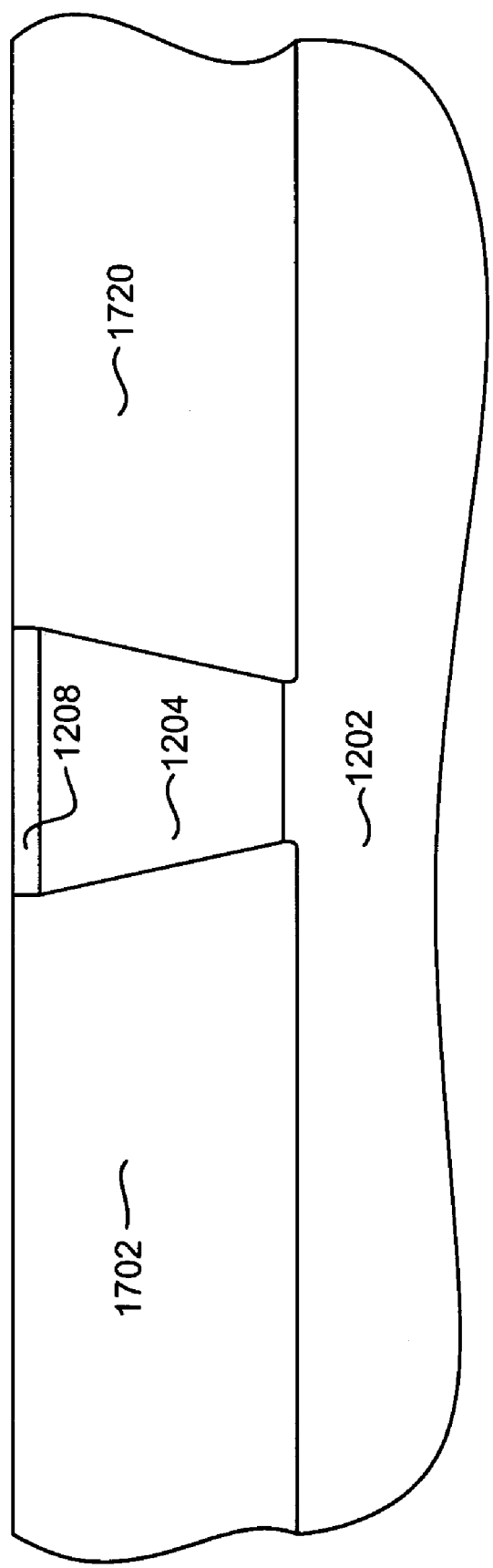

With reference now to FIG. 17, a layer of non-magnetic, electrically insulating fill material 1702 such as alumina is deposited to a height that is preferably above the write pole 202. The fill layer 1702 can be deposited by a variety of methods such as sputter deposition, chemical vapor deposition, atomic layer deposition, etc.

Figure 22:
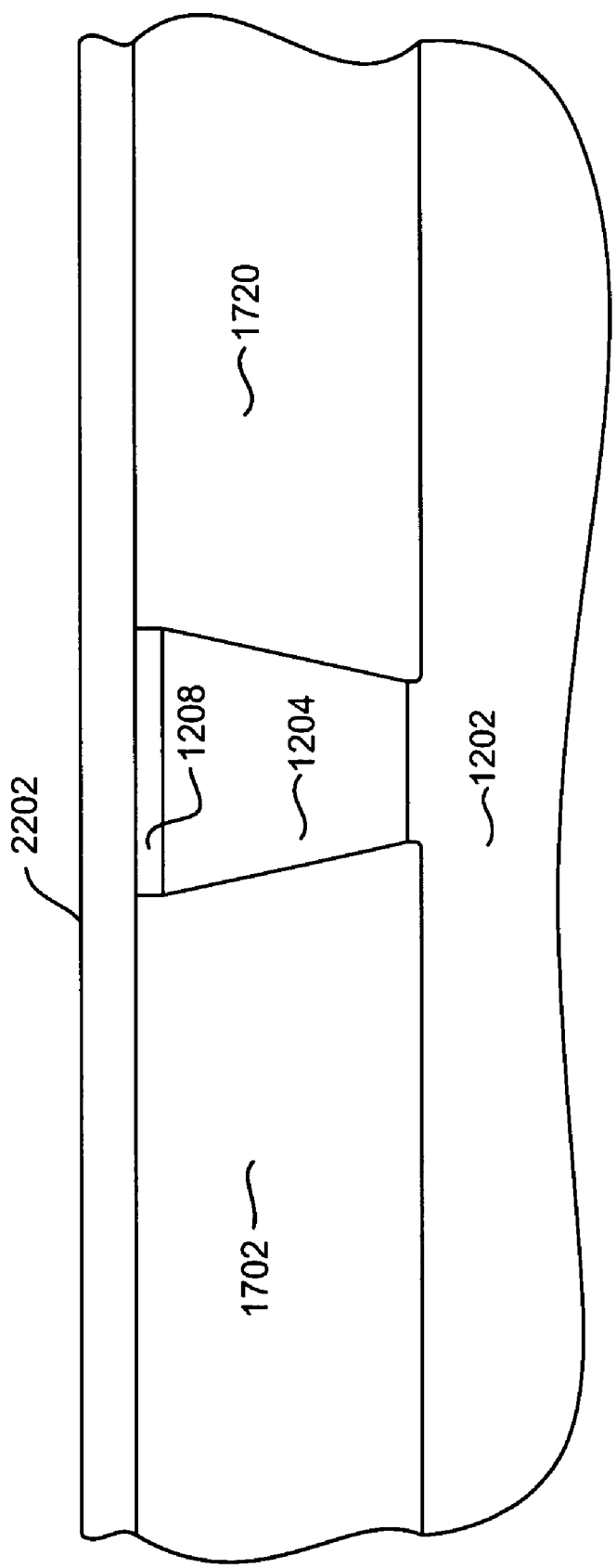
FIG. 22 is an ABS view of a write head in an intermediate stage of manufacture, illustrating a method of making a write head with a trailing shield.

In order to construct a write head having a trailing or wrap around shield, two method variations are possible. For example, with reference to FIG. 18, a chemical mechanical polishing process 1802 can be performed to remove the remaining mask layers 1212, 1210, leaving the CMP stop layer 1208. If the CMP stop layer 1208 is DLC then a RIE process can be performed to remove the CMP stop layer 1208. Otherwise, if the CMP stop layer 1208 is a material such $Si_3N_4$, $Ta_2O_5$, $SiO_2$, DLC, Rh Ru, Ir, or $Cr/AlO_2$. Then, with reference to FIG. 22 A non-magnetic conductive seed layer such as Rh, Ru, or Ir 2202 can be deposited. The thickness of the trailing shield gap will then be the thickness of the remaining CMP stop layer 1208 (if any remains) plus the thickness of the deposited gap layer. A magnetic shield can then be deposited. This process can be useful for constructing a trailing shield. Another method to remove the hard masks is to use an ion mill approach. In this approach, the hard mask structure can be alumina/X where X is an end-point detection material such as Cr, Ta, Rh, Ir, Ta2O5, $SiO_xN_y$, $Si_3N_4$, etc. To extend the ion milling process or aid in clean-up, alumina can be added on top of X. With reference to FIG. 9, after depositing a dielectric material 902, the hard masks are removed by using reactive ion milling. The endpoint material is used to signal the hard masks are removed. The trailing shield gap is the remaining hard mask and the addition of a non-magnetic and conductive seed-layer such as Ir, Rh, or Ru. Here this layer serves as trailing shield gap and seed-layer for plating the trailing shield structure. CMP or ion mill approaches can be used to fabricate trailing shield.

Figure 23:
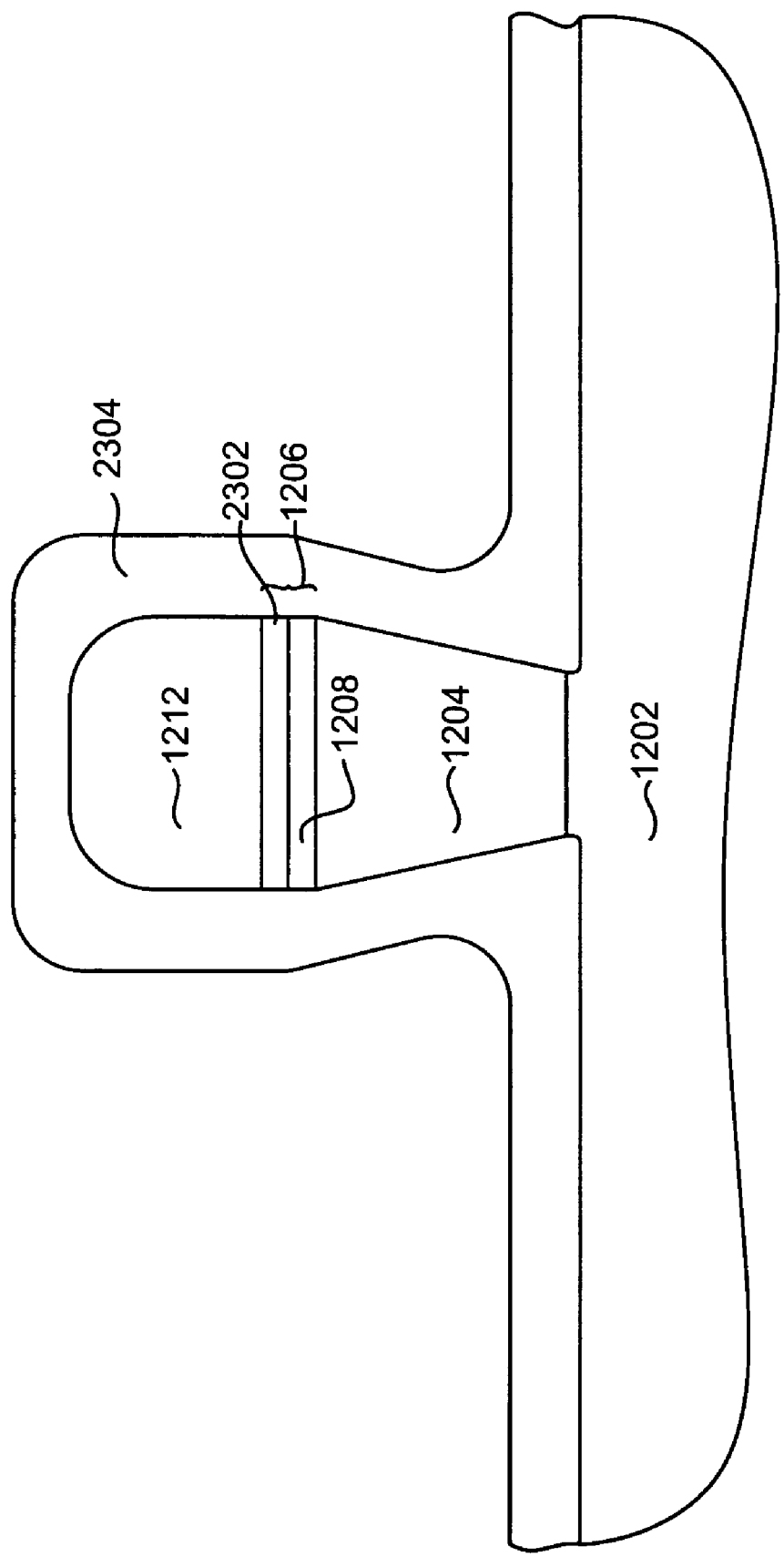
FIGS. 23-24 are ABS views of a write head in intermediate stages of manufacture, illustrating a method of making a write head with a wrap around trailing shield.

Another method for constructing a write head having a shield, as described with reference to FIG. 23 is useful in constructing a wrap around magnetic shield. In this embodiment, the bottom hard mask layer 1206 includes an ion mill endpoint detection layer 2302 such as Cr, Rh, Ru, or Ir sandwiched between two layers of non-magnetic material such as alumina. Then, after the write pole has been formed such as described in FIG. 16 a layer of non-magnetic material 2304 such as alumina is deposited, preferably by a conformal deposition process such as chemical vapor deposition, atomic layer deposition, etc.

Figure 24:
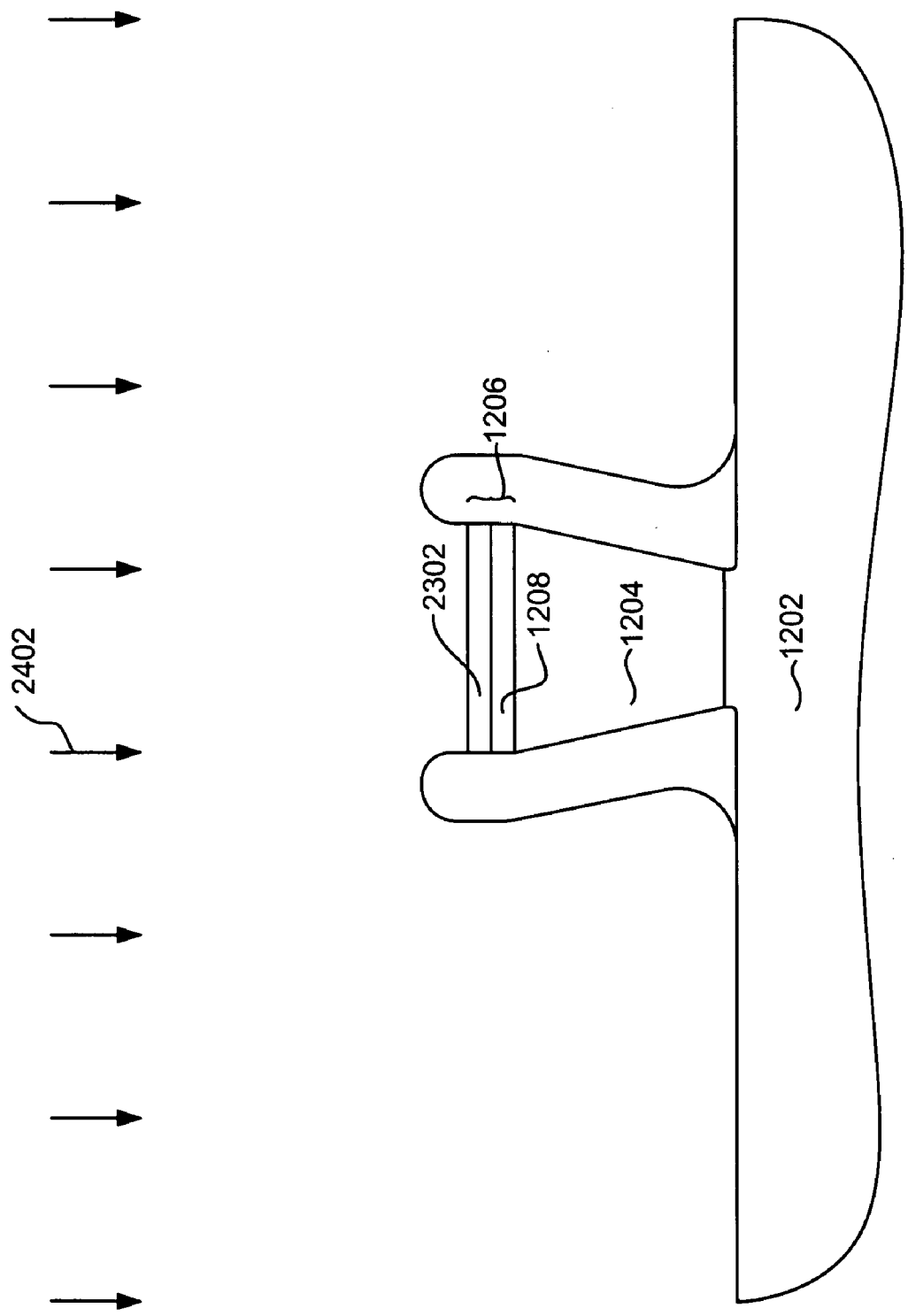

Then, with reference to FIG. 24, a reactive ion mill (RIM) is performed to preferentially remove horizontally disposed portions of the non-magnetic layer 2304 to open up the top of the non-magnetic layer 2304, resulting in non-magnetic side walls formed at the sides of the write pole 1204 that may extend above the mask layer 1206. The RIM is performed sufficiently to remove the image transfer layer 1212 and is stopped when the RIM endpoint detection layer 2302 is reached. A thin non-magnetic and conductive seed-layer such as Ta/Ir, Rh, or Ru is deposited. At this point the write head has been formed with a trailing gap that includes the remaining hard mask 1206 and non-magnetic and conductive layer, and side shields that include the atomic layer deposited alumina and non-magnetic and conductive layer 2304. A layer of magnetic material can now be deposited (not shown) to form a wrap around trailing shield such as that shown in FIG. 21.

In another approach, the bi-layer first hard mask 1206 may have a structure of: alumina/Rh; Rh/alumina; DLC/Rh; Rh/DLC; DLC/alumina; or alumina/DLC. In addition, Rh can be substituted with Cr, Ta, Ir, Ta2O5, SiOxNy, Si3N4, which can serve as a CMP stop layer. Then, after the write pole has been formed such as described in FIG. 16, a layer of non-magnetic material 2304 such as alumina can be deposited, preferably by a conformal deposition process such as chemical vapor deposition, atomic layer deposition, etc follow by oxide deposition such as $SiO_2$, $Si_3N_4$, $SiO_xN_y$. CMP is done and stopped on the CMP stop layer. The oxide layer and CMP stop layer are removed by RIE. The alumina serves as the RIE stop layer. This is follow by deposition of a thin non-magnetic and conductive seed-layer such as Ta/Ir, Rh, or Ru. At this point the write head has been formed with a trailing gap that includes the remaining hard mask 1206 and non-magnetic and conductive layer, and side shields that include the atomic layer deposited alumina and non-magnetic and conductive layer 2304. A layer of magnetic material can now be deposited (not shown) to form a wrap around trailing shield such as that shown in FIG. 21. Further manufacturing steps will be familiar to those skilled in the art, and may include for example, the deposition of additional insulation layers (not shown). While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for manufacturing a magnetic write head, comprising:
    providing a substrate;
    depositing a magnetic write pole material over the substrate;
    depositing a first hard mask;
    depositing an image transfer layer;
    depositing a second hard mask, the second hard mask layer being constructed of a bottom antireflective (BARC) material;
    depositing a photosensitive mask material;
    photolithographically patterning the photosensitive mask material to form a photomask;
    transferring a pattern of the photomask onto the underlying image transfer layer and the first and second hard mask layers; and
    performing an ion mill to remove portions of the magnetic write pole material that are not covered by the first hard mask.

2. A method as in claim 1 wherein the second hard mask comprises $Si_3N_4$.

3. A method as in claim 1 wherein the second hard mask comprises $SiO_2$ and $Si_3N_4$.

4. A method as in claim 1 wherein the second hard mask comprises silicon oxy nitride.

5. A method as in claim 1 wherein the second hard mask comprises a mixture of $(SiO_2)x$ and $(Si_3N_4)y$, the ratio of x and y being adjusted to produce a desired reflectivity.

6. A method as in claim 1 wherein the second hard mask layer comprises $TaO_5$.

7. A method as in claim 1 wherein the second hard mask layer comprises $TaO_5$, deposited as a plurality of individual layers.

8. A method as in claim 1 wherein the second hard mask layer comprises $TaO_5$, deposited as a plurality of individual layers, the number of layers being chosen to provide the second hard mask with a desired opaqueness.

9. A method as in claim 1 wherein the layer of photosensitive mask material is lithographically patterned using light of a predetermined wavelength, and wherein the second hard mask comprises $TaO_5$ deposited as a plurality of individual layers, the number of layers being chosen to make the second hard mask opaque to light of the predetermined wavelength.

10. A method as in claim 1 wherein the second hard mask comprises $TaO_5$ deposited as a plurality of layers, the number of layers being chosen to make the second hard mask opaque at light having a wavelength of 200 nm or less.

11. A method as in claim 1 wherein the image transfer layer comprises a soluble polyimide film.

12. A method for manufacturing a magnetic write head, comprising:
    providing a substrate;
    depositing a magnetic write pole material over the substrate;
    depositing a first hard mask layer, the first hard mask layer being a bilayer structure;
    depositing an image transfer layer;
    depositing a second hard mask, the second hard mask layer being constructed of a bottom antireflective (BARC) material;

depositing a photosensitive mask material;

photolithographically patterning the photosensitive mask material to form a photomask;

transferring the pattern of the photomask onto the underlying image transfer layer and the first and second hard mask layers; and performing an ion mill to remove portions of the magnetic write pole material that are not covered by the first hard mask.

13. A method as in claim 12, wherein the depositing the first hard mask further comprises depositing a layer of alumina and depositing a layer of Rh over the layer of alumina.

14. A method as in claim 12, wherein the depositing the first hard mask further comprises depositing a layer of Rh and depositing a layer of alumina over the layer of Rh.

15. A method as in claim 12, wherein the depositing the first hard mask further comprises depositing a layer of diamond like carbon (DLC) and depositing a layer of Rh over the layer of DLC.

16. A method as in claim 12, wherein the depositing the first hard mask further comprises depositing a layer of Rh and depositing a layer of diamond like carbon (DLC) over the layer of Rh.

17. A method as in claim 12, wherein the depositing the first hard mask further comprises depositing a layer of diamond like carbon (DLC) and depositing a layer of alumina over the layer of DLC.

18. A method as in claim 12, wherein the depositing the first hard mask further comprises depositing a layer of alumina and depositing a layer of diamond like carbon (DLC) over the layer of alumina.

19. A method as in claim 12, wherein the image transfer layer comprises a soluble polyimide film.

20. A method as in claim 12, wherein the second hard mask comprises silicon oxy nitride.

21. A method as in claim 12, wherein the second hard mask comprises a mixture of $SiO_2$ and $Si_3N_4$.

22. A method as in claim 12, wherein the second hard mask comprises $Ta_2O_5$.

23. A method as in claim 12, wherein the second hard mask comprises multiple layers of $Ta_2O_5$.

* * * * *